US010607400B2

(12) United States Patent
Kakarlapudi et al.

(10) Patent No.: US 10,607,400 B2
(45) Date of Patent: Mar. 31, 2020

(54) GRAPHICS PROCESSING SYSTEMS USING A VERTEX SHADER TO RENDER PLURAL IMAGES

(71) Applicant: ARM Limited, Cambridge (GB)

(72) Inventors: Sandeep Kakarlapudi, Trondheim (NO); Jorn Nystad, Trondheim (NO); Andreas Due-Engh Halstvedt, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/594,969

(22) Filed: May 15, 2017

(65) Prior Publication Data

US 2017/0330372 A1    Nov. 16, 2017

(30) Foreign Application Priority Data

May 16, 2016 (GB) .................................. 1608572.2

(51) Int. Cl.
*G06T 1/20* (2006.01)
*G06T 15/40* (2011.01)
(Continued)

(52) U.S. Cl.
CPC ............ *G06T 15/405* (2013.01); *G06T 11/40* (2013.01); *G06T 15/04* (2013.01); *G06T 15/80* (2013.01);
(Continued)

(58) Field of Classification Search
None
See application file for complete search history.

(56) References Cited

U.S. PATENT DOCUMENTS 8,542,247 B1   9/2013  Hakura
2008/0007559 A1*  1/2008  Kalaiah ............... H04N 13/275
345/501
(Continued)

FOREIGN PATENT DOCUMENTS

EP    2854401    4/2015
GB    2527822    1/2016

OTHER PUBLICATIONS

GB Combined Search and Examination Report, dated Nov. 16, 2016, GB Patent Application GB1608572.2.
(Continued)

*Primary Examiner* — Xiao M Wu
*Assistant Examiner* — Steven Z Elbinger
(74) *Attorney, Agent, or Firm* — Vierra Magen Marcus LLP

(57) ABSTRACT

A graphics processing pipeline comprises vertex shading circuitry that operates to vertex shade position attributes of vertices of a set of vertices to be processed by the graphics processing pipeline, to generate, inter alia, a separate vertex shaded position attribute value for each view of the plural different views. Tiling circuitry then determines for the vertices that have been subjected to the first vertex shading operation, whether the vertices should be processed further. Vertex shading circuitry then performs a second vertex shading operation on the vertices that it has been determined should be processed further, to vertex shade the remaining vertex attributes for each vertex that it has been determined should be processed further, to generate, inter alia, a single vertex shaded attribute value for the set of plural views.

14 Claims, 7 Drawing Sheets

(51) Int. Cl.
*G06T 11/40* (2006.01)
*H04N 13/275* (2018.01)
*G06T 15/04* (2011.01)
*G06T 15/80* (2011.01)
*G06T 19/20* (2011.01)
*G06T 15/00* (2011.01)

(52) U.S. Cl.
CPC ............ *G06T 19/20* (2013.01); *H04N 13/275* (2018.05); *G06T 1/20* (2013.01); *G06T 15/005* (2013.01)

(56) References Cited

U.S. PATENT DOCUMENTS

| | | | |
|---|---|---|---|
| 2010/0164983 A1* | 7/2010 | Lawrence | G06T 15/00 345/611 |
| 2010/0302246 A1 | 12/2010 | Jiao | |
| 2011/0148901 A1* | 6/2011 | Adams | G06T 11/40 345/589 |
| 2015/0325037 A1* | 11/2015 | Lentz | G06T 1/20 345/419 |
| 2016/0035128 A1 | 2/2016 | Zhao | |
| 2016/0350892 A1* | 12/2016 | Zhong | G06T 1/20 |

OTHER PUBLICATIONS

GB Search Report dated Jan. 9, 2015, UK Patent Application GB1411892.1.
GB Examination Report dated Sep. 9, 2019, GB Patent Application No. GB1608572.2.

* cited by examiner

Fused Tilelist

71 Left view image

| (0,0) | (1,0) | (2,0) | (3,0) |
| (0,1) | (1,1) | (2,1) | (3,1) |
| (0,2) | (1,2) 75 | (2,2) | (3,2) |
| (0,3) | (1,3) | (2,3) | (3,3) |

72 Right view image

| (0,0) | (1,0) | (2,0) | (3,0) |
| (0,1) | (1,1) | (2,1) | (3,1) |
| (0,2) 75 | (1,2) | (2,2) | (3,2) |
| (0,3) | (1,3) | (2,3) | (3,3) |

Tilelist entry when a primitive is binned to different bins in each views:

TILE (1,2) : primitive indices: $i_0\ i_1\ i_2$ view-mask: 2'b10 — 76
TILE (0,2) : primitive indices: $i_0\ i_1\ i_2$ view-mask: 2'b01 — 77

GRAPHICS PROCESSING SYSTEMS USING A VERTEX SHADER TO RENDER PLURAL IMAGES

BACKGROUND

The technology described herein relates to graphics processing systems, and in particular to the operation of graphics processing pipelines that perform multiview rendering in graphics processing systems.

Graphics processing is normally carried out by first splitting a scene (e.g. a 3-D model) to be displayed into a number of similar basic components or "primitives", which primitives are then subjected to the desired graphics processing operations. Each primitive is usually defined by and represented as a set of vertices, where each vertex typically has associated with it a set of "attributes", i.e. a set of data values for the vertex. These attributes will typically include position data and other, non-position data (varyings), e.g. defining colour, light, normal, texture coordinates, etc, for the vertex in question.

Once primitives and their vertices have been generated and defined, they can be processed by the graphics processing system, in order to generate the desired graphics processing output (render target), such as a frame for display. This typically involves performing an initial so-called "vertex shading" operation on the attributes of the vertices defined for the given graphics processing output (e.g. draw call), before the primitives are rasterised and rendered. This "vertex shading" operation operates to transform the attributes for each vertex into a desired form for the subsequent graphics processing operations.

A graphics processing pipeline will typically therefore include a vertex shading stage (a vertex shader) that executes vertex shading computations on the initial vertex attribute data (i.e. vertex attribute values) defined for the vertices so as to generate a desired set of output vertex attribute data (i.e. appropriately "shaded" attribute values) for use in subsequent processing stages of the graphics processing pipeline.

A vertex shading operation typically performs graphics processing by running small programs for each work item in each output to be generated, such as each render target, e.g. frame (a "work item" in this regard is usually a vertex). Typically, the output to be generated will be divided into smaller units of processing, referred to as "draw calls", where each draw call will have a respective set of work items (vertices) defined for it and a set of primitives that use those work items (vertices).

In a vertex shading operation, each work item will typically be processed by means of an execution thread which will execute the first vertex shading operation for the work item in question. Modern graphics processing units (graphics processors) accordingly typically comprise programmable processing circuitry, e.g. in the form of one or more programmable execution units, that can execute vertex shader programs to perform the vertex shading computations. A given vertex shader program to be executed by the programmable processing circuitry (execution unit) will comprise a sequence of instructions (an execution thread), and the programmable processing circuitry (execution unit) will execute the instructions in the sequence appropriately for each execution thread (and work item) that the first vertex shading operation is to be executed for.

A vertex shading operation (program) to be executed by a given vertex shading stage of a graphics processing pipeline will be provided by the application that requires the graphics processing using a high-level shader programming language, such as GLSL, HLSL, OpenCL, etc. The high-level shader program is then translated by the shader language compiler to binary code for the target graphics processing pipeline. This binary code will consist of "instructions" which are specified in the instruction set specification for the given target graphics processing pipeline.

It is becoming increasingly common for graphics processing systems to be required to perform so-called "multiview" rendering. In this case, plural different views of a given scene are rendered, e.g. from plural different viewpoints, so as to create a set of images of the scene, with each image, e.g., viewing the scene from a different viewpoint. An example of this is stereoscopic rendering in which two images of a scene, one corresponding to the scene as seen from the left eye, and one corresponding to the scene as seen from the right eye, are generated and then displayed appropriately so as to provide a three-dimensional effect when the images are viewed. It is also known to generate and provide more than two views of a scene, for example for a lenticular display (which can, for example, use four or more images offset from each other).

In such cases, the vertex shading stage of the graphics processing pipeline will typically perform vertex shading for all attributes (attribute values) defined for the vertices separately for each view. When it comes to generating the multiple views required, typically the image corresponding to each respective view is generated separately and then the images displayed appropriately to achieve the desired, e.g. 3D, effect.

The Applicants believe that there remains scope for improvements to the generation of multiple images corresponding to multiple different views of the same scene when performing multiview rendering in graphics processing systems.

BRIEF DESCRIPTION OF THE DRAWINGS

A number of embodiments of the technology described herein will now be described by way of example only and with reference to the accompanying drawings, in which.

Like reference numerals are used for like features throughout the drawings, where appropriate.

DETAILED DESCRIPTION

Figures 1, 2:
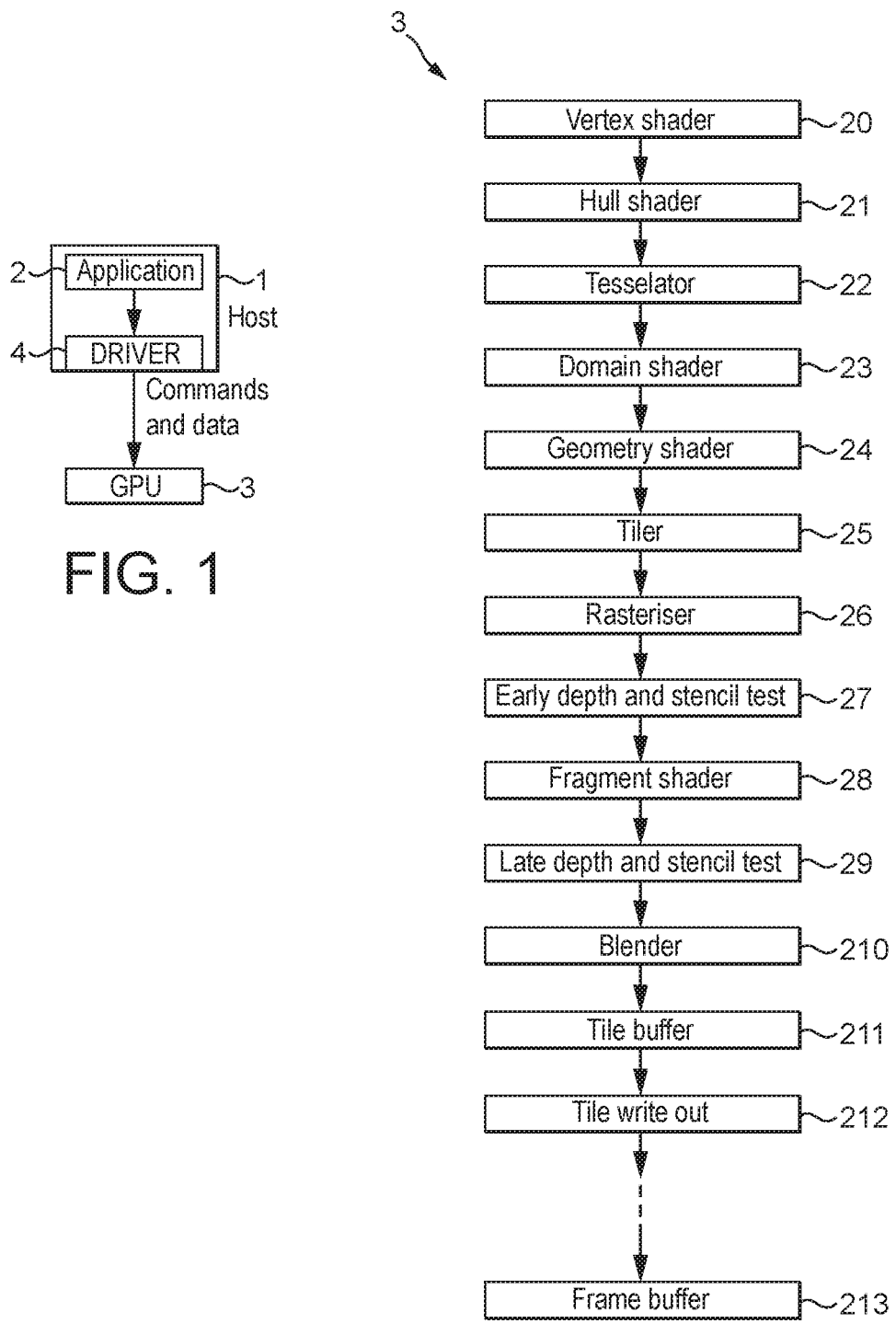
FIG. 1 shows an exemplary computer graphics processing system.
FIG. 2 shows schematically a graphics processing pipeline that can be operated in the manner of the technology described herein.

A first embodiment of the technology described herein comprises a method of operating a graphics processing system, the graphics processing system including:

a graphics processing pipeline comprising a vertex shading stage that is operable to perform vertex shading operations on initial vertex attribute data associated with the vertices to generate vertex shaded attribute data;

the method comprising, when rendering a set of plural images representing plural different views of the same scene:

performing a first vertex shading operation on a vertex to be processed by the graphic processing pipeline, wherein the first vertex shading operation comprises performing vertex shading computations on one of plural vertex attribute values of the initial vertex attribute data associated with the vertex, so as to generate vertex shaded attribute data for the vertex attribute value comprising a separate vertex shaded attribute value for each view of the set of plural different views of the scene;

determining whether the vertex that has been subjected to the first vertex shading operation should be processed further for at least one of the plural views, using, at least in part, some or all of the vertex shaded attribute values generated by the first vertex shading operation for the plural views; and when it is determined that the vertex should be processed further for at least one of the plural views, performing a second vertex shading operation on the vertex, wherein the second vertex shading operation comprises performing a vertex shading computation on a different vertex attribute value of the plural vertex attribute values associated with the vertex, so as to generate for the vertex attribute value, vertex shaded attribute data comprising a single vertex-shaded attribute value that is common to each view of the plural different views.

A second embodiment of the technology described herein comprises a graphics processing system for rendering a set of plural images representing plural different views of the same scene, the graphics processing system including a graphics processing pipeline comprising:

a first vertex shading stage configured to perform a first vertex shading operation on a vertex to be processed by the graphic processing pipeline, wherein the first vertex shading operation comprises performing vertex shading computations on one of plural vertex attribute values of the initial vertex attribute data associated with the vertex, so as to generate vertex shaded attribute data for the vertex attribute value comprising a separate vertex shaded attribute value for each view of the set of plural different views of the scene;

a testing stage configured to determine whether the vertex that has been subjected to the first vertex shading operation should be processed further for at least one of the plural views, using, at least in part, some or all of the vertex shaded attribute values generated by the first vertex shading operation for the plural views; and a second vertex shading stage configured to, when it is determined that the vertex should be processed further for at least one of the plural views, perform a second vertex shading operation on the vertex, wherein the second vertex shading operation comprises performing a vertex shading computation on a different vertex attribute value of the plural vertex attribute values associated with the vertex, so as to generate for the vertex attribute value, vertex shaded attribute data comprising a single vertex-shaded attribute value that is common to each view of the plural different views.

In the technology described herein, unlike in conventional vertex shading arrangements, the vertex shading operation is divided into two parts (the technology described herein uses a "two-pass" vertex shading arrangement), a first vertex shading operation that generates vertex shaded attribute data for at least one of the set of plural attribute values associated with a vertex, and a second vertex shading operation that generates vertex shaded attribute data for attribute values of the vertex that were not subjected to the first vertex shading operation. Between the first and second vertex shading operations, the vertex shaded attribute values (of the vertex shaded attribute data) from the first vertex shading operation are used, at least in part, to determine if the vertex should be processed further (e.g. are required for generating the output) for at least one view of the set of plural views to be rendered, and if it is determined that the vertex should be processed further for at least one of the plural views, that vertex is subjected to the second vertex shading operation.

The Applicants have recognised that in many cases not all the vertices defined for an, e.g. set of plural images, will in fact be used to generate the desired graphics output(s), e.g. frame(s) for display. This may occur, e.g., when one or more vertices lie outside of the view frustums of the plural images or when one or more vertices belong (solely) to back facing primitives in the plural images. The Applicants have further recognised that any vertex shading computations performed for such "unused" vertices are ultimately redundant.

The technology described herein addresses this by splitting the vertex shading into two stages, and conditionally executing the second stage for the vertices that it is determined should be processed further for at least one of the plural views (e.g. that are determined to be required to generate the graphics processing output). In this way, only a reduced set of vertex shading computations (i.e. those that were done in the first vertex shading operation) can be performed for vertices that are determined (at the testing stage) will in fact be "unused".

The first vertex shading operation on a vertex to be processed is also configured to perform vertex shading computations on a vertex attribute value associated with the vertex to generate a separate vertex shaded attribute value for each view. The second vertex shading operation is configured to perform vertex shading processing on a different vertex attribute value associated with the vertex to generate a single vertex shaded attribute value that is common to the set of plural different views.

The Applicants have recognised in this regard that when performing multiview rendering, there may be some vertex attribute values associated with a vertex that will (after being shaded) produce different results for different views of the scene (i.e. that will be "view dependent"), but there may also be other vertex attribute values associated with the vertex that will produce the same result for each view (i.e. that will, in effect, be "view independent"). The Applicants have further recognised that the vertex shaded attribute values that are required to determine if the vertex should be processed further in at least one of the plural views of the scene include at least some that are view-dependent.

The technology described herein exploits this, by configuring the first vertex shading operation to generate a separate vertex shaded attribute value for each view, whereas the second vertex shading operation is configured to generate a single vertex shaded attribute value for the set of plural views.

This has the effect that in the technology described herein, view dependent attribute values required for the testing stage are shaded for each view, but rather than performing the vertex shading for a view-independent vertex attribute value separately for each view (image) in the second vertex shading operation, the view-independent vertex attribute value can be shaded only once (to produce only a single output for the set of views). This then has the effect that some vertex shading computations can, e.g., be performed "per view", whereas other vertex shading processing can be performed only once for the complete set of views, thereby reducing the overall amount of vertex shading computations performed for the vertex.

The scene that is to be represented by plural images will be (and in embodiments is) a computer generated, three-dimensional model provided to (or generated by) the graphics processing system.

The set of plural images to be rendered can represent any suitable and desired number of views of the scene.

In one embodiment, the set of plural images represent the scene from the same viewpoint. In such cases, the plural images could represent the scene with different fields of view and/or scaling factors. The latter case would allow parts of the same view to be rendered at higher resolution, for example.

In an embodiment, the plural images represent the scene from different viewpoints. However, in some cases the set of plural images could comprise at least one image representing the scene from the same viewpoint as another image, and at least one image representing the scene from a different viewpoint to another image of the set of plural images.

In an embodiment, a set of plural images comprising more than two images representing more than two different viewpoints of the scene are rendered, e.g. for the purpose of providing a lenticular display. For example, the graphics processing system could be configured to render four or more images representing the same scene from different viewpoints.

In an embodiment, a set of plural images comprising only a pair of images representing the same scene from two different viewpoints are rendered, e.g. for the purpose of providing a stereoscopic display.

In the case of a stereoscopic display at least, each image of the set of two images (a stereo image pair) should, and in an embodiment does, represent a view frustum representing the cone of vision that a human eye would have.

For a stereoscopic display, the first image of the stereo image pair should, and in an embodiment does, represent the scene from the viewpoint of one eye, e.g. the left eye, and the second image of the pair should, and in an embodiment does, represent the scene from the viewpoint of the other, e.g. right, eye. The images may accordingly be referred to as "left" and "right" images, respectively. In embodiments the different viewpoints are separated by an appropriate distance (in three dimensional model space), e.g. an interocular distance, such that their view frustums replicate the field of view of the eyes of a human.

It would also be possible for the set of plural different images of the scene to, for example, include both views from different viewpoints, and views from the same viewpoint but which differ in some other way.

Other arrangements would, of course, be possible.

The method of the technology described herein may be executed for a single vertex to be processed by the graphics processing pipeline. However, it is in an embodiment executed for plural vertices (for a set of plural vertices) that are to be processed for the purpose of rendering the set of plural images representing the plural different views of the scene.

Thus, in an embodiment, the method of the technology described herein is respectively performed for each vertex of a set of plural vertices that are to be processed by the graphics processing pipeline. This set of vertices may, and in an embodiment does, comprise the entire set of vertices defined for the scene that is being rendered. It may also comprise a set of vertices that is defined for less than the entire scene, such as a set of vertices defined for a given draw call. Thus, according to an embodiment, the set of vertices is a set of vertices defined for a draw call.

Where the set of vertices is less than the entire set of vertices defined for the scene being rendered, then in an embodiment the operation in the manner of the technology described herein is repeated appropriately for each set of vertices (e.g., and in an embodiment, each draw call) defined for the scene. Correspondingly, the computation of the technology described herein is in an embodiment repeated for plural sets of plural images to be generated, e.g. for successive scenes in a sequence of scenes to be rendered.

The first vertex shading operation that processes (vertex shades) a vertex may process only some but not all of the vertices of the set of vertices, but in an embodiment processes all of the vertices of the set of vertices being processed (i.e. each vertex in the set of vertices being processed is subjected to the first vertex shading operation).

The first vertex shading operation performs vertex shading (vertex shading computations) for a vertex attribute value of the initial vertex attribute data associated with the vertex.

According to an embodiment, the first vertex shading operation is performed before the testing stage of the graphics processing pipeline. In a an embodiment, however, the first vertex shading operation for a vertex is performed as part of the testing stage, as needed during the testing stage. For example, it would be possible, and it is done in some embodiments, for the testing stage (e.g. the tiler) to trigger the first vertex shading operation for a vertex as and when vertex shaded attribute data for the vertex is required during the testing stage (e.g. immediately before the testing stage determines whether or not the vertex is to be processed further).

The vertex attribute value that is processed in the first vertex shading operation can be any desired and suitable vertex attribute value. There may be only one attribute value that is processed, or there may be plural attribute values that are processed.

However, as the first vertex shading operation is configured to generate a separate vertex shaded attribute value (for the vertex attribute value) for each view of the set of plural views, the vertex attribute value is in an embodiment one whose vertex shaded attribute value is view dependent.

In an embodiment, only the vertex attribute values whose vertex shaded attribute values will vary for different views of the set of plural images (i.e. the view-dependent attribute values) are processed in the first vertex shading operation (and thus in an embodiment vertex attribute values whose vertex shaded attribute values will not vary for different views are not processed in the first vertex shading operation). It would also be possible to computation one or more other vertex attribute values whose vertex shaded attribute values will not vary for different views, as well as the vertex attribute values whose vertex shaded attribute values will vary for different views, if desired.

Where the first vertex shading operation performs vertex shading computations on a vertex attribute value whose vertex shaded attribute values will not vary for different views, the first vertex shading operation could generate (as a result of those computations) vertex shaded attribute data comprising a separate vertex shaded attribute value for each view (for the attribute value). However, the first vertex shading operation will in an embodiment only generate a single vertex-shaded attribute value that is common to each view of the plural different views for the vertex attribute value(s) that is view-independent.

Thus according to an embodiment, the first vertex shading operation further comprises: performing vertex shading computations on another vertex attribute value of the plural values of the vertex (e.g. that whose vertex shaded attribute value will not vary for different views of the set of plural different views), so as to generate vertex shaded attribute data for the vertex attribute value, comprising a single vertex-shaded attribute value that is common to each view of the plural different views.

In an embodiment, the attribute value(s) that is processed in the first vertex shading operation is, e.g., selected based on which tests are to be performed at the testing stage to determine whether a vertex should be processed further for at least one of the plural views (and correspondingly which condition(s) that must be met if a vertex is to be determined as needing to be processed further).

The Applicants have recognised in this regard that the position of a vertex can be used to determine if it should be processed further for at least one of the plural views, and, moreover, that in such cases, the vertex shaded attribute values required to determine if a vertex should be processed further for at least one of the plural views is the vertex shaded position attribute values.

Thus, in embodiments of the technology described herein, the first vertex shading operation comprises performing vertex shading computations on the attribute values of the position attributes of the vertex being processed. Thus, the first vertex shading operation in an embodiment transforms at least, and in an embodiment only, the position attributes of the vertices being processed, and the vertex attribute value(s) that is processed in the first vertex shading operation comprises one or more position attribute values of the vertex.

Usually there will only be a single position attribute for a vertex, consisting of (X, Y, Z, W) values. In this case, the first vertex shading operation on a vertex will comprise performing vertex shading computations on vertex attribute values associated with a single position attribute of the vertex. However, in other cases a vertex will have other, additional position attributes associated therewith, such as a point size or a line width (e.g. when rendering points and lines). Thus, the first vertex shading operation may comprise performing vertex shading computations on vertex attribute values associated with another position attribute of the vertex.

In most cases in which the position attribute for a vertex consists of (X, Y, Z, W) values, only the X component value of the position attribute will vary for different views. This is because in most cases, such as in stereoscopic rendering, the viewpoints are separated along one axis (e.g. the horizontal x-axis) only, to replicate the binocular vision of human eyes. Thus, the first vertex shading operation may be configured appropriately such that some of the position attribute values (e.g. Y, Z, W component values) are shaded only once for the different views, whilst at least one other position attribute value (e.g. the X component value) is shaded separately for each view.

In an embodiment all the position attribute values are vertex shaded in the first vertex shading operation, but less than all, such as only one of the position attribute values (e.g. the X component value) could be processed, if desired (e.g. if the Y, Z, W values are not required at the testing stage).

The first vertex shading operation for a vertex is in an embodiment implemented by means of a vertex shader core executing an appropriate vertex shader (vertex shading program) for the vertex. Each vertex to be processed is in an embodiment represented as an execution thread, which threads execute the appropriate vertex shading program to carry out the first vertex shading operation. In an embodiment there is one execution thread per vertex to be processed per view.

Thus the first vertex shading computations are in an embodiment implemented using execution threads that execute a sequence of program instructions that effect the first vertex shading operation.

The vertex shader (vertex shading program) that the vertex execution threads execute for the first vertex shading operation can be configured in any desired and suitable manner. It in an embodiment comprises a limited (e.g. lightweight) version of the vertex shader that has been defined for the graphics processing output (e.g. draw call) in question. Thus, it in an embodiment comprises only part but not all of the vertex shader that has been defined for the graphics processing output (e.g. draw call) in question.

The configuration of the vertex shader (vertex shading program) for the first vertex shading operation can be achieved in any suitable and desired manner. In an embodiment, the vertex shader (vertex shading program) supplied by the application that requires the graphics processing (i.e. that has been defined for the graphics processing output in question) is modified to remove (delete) the attribute values that are not to be processed by the first vertex shading operation and then recompiled.

In an embodiment, the operation to do this comprises parsing the complete vertex shader (vertex shading program) supplied by the application that requires the graphics processing (i.e. that has been defined for the graphics processing output in question), and then creating two modified versions of the parsed shader program, and in one modified version of the parsed shader program deleting all attribute values except the position attribute values and, in an embodiment, performing dead code elimination to remove all code that does not contribute to the vertex shaded position attribute values, and then in the other modified version deleting all code that does contribute to the vertex shaded position attribute values and optimising the shader program.

The first modified version of the shader program, where all output attributes except the position output have been deleted is then used for the first vertex shading operation, with the second modified version for which conversely the position output has been removed then being used for the second vertex shading operation. This then straightforwardly gives the shader code that which is needed for the two vertex shading operations of the technology described herein. As will be described further below, this may be done by any suitable element of the overall graphics processing system, such as, and in an embodiment, the compiler for the vertex shader (i.e. the compiler that translates the shader program from the high-level shader programming language to binary code for the target graphics processing pipeline).

Other arrangements for dividing the vertex shader (the vertex shading programs) into respective shaders (programs) for the first and second vertex shading operations would, of course, be possible.

In addition to deriving the vertex shader for the first vertex shading operation from the, e.g., complete vertex shader supplied by the application that requires the graphics processing, the derived vertex shader for the first vertex shading operation is in an embodiment further configured to perform vertex shading computations on a vertex attribute value (e.g. the view dependent position attribute values) to generate a separate vertex shaded attribute value for each view of the set of plural views of the scene (and where appropriate to perform a vertex shading computation on a vertex attribute value (e.g. view-independent position attribute value) to generate a single vertex shaded attribute value that is common to the plural different views).

The vertex shader (vertex shading program) for the first vertex shading operation can be configured to perform vertex shading computations on a vertex attribute value (e.g. the view dependent position attribute values) to generate a separate vertex shaded attribute value for each view of the set of plural views of the scene in any suitable and desired way.

According to an embodiment of the technology described herein, the technology described herein comprises determining whether the first vertex shading operation (program) includes a vertex shading computation that should be performed once for each view of the plural different views of the scene, to generate a separate vertex shaded attribute value for each view of the plural different views of the scene; and when it is determined that the first vertex shading operation includes a vertex shading computation that should be performed once for each view of the plural different views of the scene, including in the vertex shading program, a sequence of at least one graphics program instruction that when executed will cause the vertex shading computation that should be performed once for each view of the plural different views of the scene to be performed once for the each view of the plural different views of the scene, to generate a separate vertex shaded attribute value for each view of the plural different views of the scene.

The sequence of at least one graphics program instruction in an embodiment comprises:
a set of instructions that will cause the first vertex shading stage of the graphics processing pipeline to perform a vertex shading computation on a vertex attribute value of the vertex, to generate, for the vertex attribute value, a vertex shaded attribute value for a first view of the plural different views of the scene; and
at least one instruction that will cause the first graphics processing stage to return to an earlier stage (e.g. the beginning) of the sequence of at least one graphics program instruction to perform the same set of instructions that will cause the first vertex shading stage of the graphics processing pipeline to perform a vertex shading computation on a vertex attribute value of the vertex, to generate, for the vertex attribute value, a vertex shaded attribute value for a second view of the plural different views of the scene.

In this way, the vertex shader for the first vertex shading operation is essentially repeated (run again) for the desired vertex attribute value once for each view of the plural different views of the scene. In other words, the vertex shader for the first vertex shading operation for a desired vertex attribute value is invoked multiple times, once for each view of the plural different views.

The at least one instruction that will cause the first graphics processing stage to return to an earlier stage (e.g. the beginning) of the sequence of at least one graphics program instruction in an embodiment comprises any instruction/information necessary for the view in question, such as instructions to load the appropriate input values for the view in question.

Re-running the vertex shader for each view is particularly useful in that it requires little modification of the vertex shader (vertex shading program) in order to work. The only modification required is to include in the vertex shader program at least one instruction that will cause the first graphics processing stage to return to an earlier stage (e.g. the beginning) of the sequence of at least one graphics program instruction to perform the desired computation (for the desired vertex attribute value) again for another view.

According to another embodiment of the technology described herein, the vertex shader for the first vertex shading operation is not repeated (and invoked) for each view of the plural different views of the scene. Instead, the vertex shader (program) for the first vertex shading operation is modified such that the vertex shader (program) generates (and outputs) a separate vertex shaded attribute value for a vertex attribute value for each view of the set of views during a single run (invocation) of the vertex shader (program).

In an embodiment, the set of instructions that when executed will cause the first vertex shading stage of the graphics processing pipeline to perform the desired vertex shading computation (that should be performed once per view) is included in the vertex shader (program) for the first vertex shading operation multiple times, once for each view (for which the computation is to be performed and an output value generated).

Thus, the set of instructions for performing the vertex shading computation in question is in an embodiment repeated plural times in the sequence of at least one graphics program instruction (for performing the vertex shading computation in question once for each view), once for each view (and thus will be repeated N times, where N different views of the scene are to be rendered).

In this case, each set of the set of instructions for performing the vertex shading computation in the vertex shader is in an embodiment configured, if necessary, and as appropriate, to perform the computation for one of the views (and for the view in question). Thus each respective set of the set of instructions for the vertex shading computation may have its e.g., and in an embodiment, load and store instructions appropriately configured so as to load the appropriate input values for the view in question, and to store its output value or values appropriately (and separately) for the view in question.

A computation of the first vertex shading operation can be identified as needing to be performed separately for each view of the set of plural views that is being rendered, in any suitable and desired manner.

In an embodiment this is determined from information such as state information, a variable or variables, and/or metadata, associated with the vertex shader program code that identifies a given vertex shading computation as needing to be performed separately for each view. Such information in an embodiment comprises an indication that the vertex shader computation (e.g. that the vertex attribute value that the computation relates to) is view-dependent or not.

For example, a given vertex shading computation and/or vertex attribute value may have a "view identifier" (a view ID) associated with it in the first vertex shading program code, e.g. to identify which view that set of instructions in the program code relates to. This is particularly the case for the OVR_multi-view extension for OpenGL/OpenGL ES. (Corresponding arrangements can be used for other graphics APIs.)

The fact that a first vertex shading operation computation and/or vertex attribute value is associated with a view identifier in the first vertex shading program code, and is in an embodiment, used to identify those vertex shading computations and attributes that need to be performed separately for each view, with the system, e.g. compiler, then including appropriately repeated sets of instructions for that process, once for each view, in the first vertex shading operation program that is provided to the graphics processing pipeline for execution.

Correspondingly, where a vertex shading computation and/or vertex attribute value does not have any view identifier associated with it in the first vertex shading operation program code, then the system, e.g. compiler, can use that information to determine and recognise that that vertex shading computation and/or attribute value is view-independent and is not needed to be performed and/or processed separately for each view.

Other arrangements for determining whether a given first vertex shading operation computation should be performed separately for each view can of course be used, if desired.

In addition to the above, the first vertex shading operation (the vertex shader program thereof) can be configured to cause the vertex shading stage (when it executes the first vertex shader program) to perform a different vertex shading computation on a different vertex attribute value of the plural vertex attribute values associated with the vertex only once, so as to generate for that vertex attribute value a single vertex-shaded attribute value that is common to each view of the plural different views.

Thus the vertex shaded data generated by the vertex shading stage during the first vertex shading operation may include multiple vertex shaded attribute values (one vertex shaded attribute value for each view) for a given initial attribute value of a vertex and a single vertex shaded attribute value (for the set of plural different views) for a different attribute value of the vertex.

The vertex shading program can be configured to cause the vertex shading stage to perform a vertex shading computation on a vertex attribute value only once, to generate for that vertex attribute value a single vertex-shaded attribute value that is common to each view of the plural different views, in any appropriate and desired manner (as will be described further below with respect to the second vertex shading operation).

The vertex shaded attribute values (data) that are generated by the first vertex shading operation should be, and is in an embodiment, stored appropriately for subsequent use by the graphics processing pipeline. It is in an embodiment stored in the normal manner for vertex shaded attribute data in the graphics processing pipeline (system) in question. (There will also be initial, i.e. non-vertex shaded, vertex data (attribute values) at this stage.)

It is then determined for the vertex (or set of vertices) that have been subjected to the first vertex shading operation whether that vertex (or set of vertices) should be processed further for at least one of the plural views. This can be done once the first vertex shading operation has been completed for all the vertices to be subjected to the first vertex shading operation. However, the determination is in an embodiment performed for a vertex (or set of vertices) as soon as the vertex (or set of vertices) has been processed in the first vertex shading operation. This facilitates for example, reuse of any already cached vertex data that has been cached for the first vertex shading operation.

Thus, in an embodiment, the determination of whether a vertex or a set of vertices should be processed further for at least one of the plural views is in an embodiment performed once the first vertex shading operation has been completed for that vertex or set of vertices, and without waiting for the first vertex shading operation to be completed for all (and, in an embodiment, for other and in an embodiment for any other) of the vertices in the set of vertices being processed.

The determination is in an embodiment done for all the vertices that have been subjected to the first vertex shading operation (although this is not essential, and if desired only some but not all of the vertices that have been subjected to the first vertex shading operation could be subjected to this determination).

The determination of whether a vertex (or set of vertices) should be processed further for at least one of the plural views following the first vertex shading operation can be performed in any desired and suitable manner and using any desired and suitable test to determine if the vertex (or set of vertices) should be processed further for at least one of the plural views.

In an embodiment, this computation determines whether the vertex (or set of vertices) could be required for generating an output of the overall graphics processing operation in question (i.e. whether the vertex could be needed to contribute to one of the images of the set of plural images to be rendered).

The determination is in an embodiment carried out in an appropriately conservative manner, so as to only discard from further processing (e.g. the second vertex shading operation) any vertices that it can be determined with sufficient certainty will not be required for generating the output of the graphics processing operation.

In an embodiment, this determination comprises determining whether the vertex belongs to (is to be used for) a primitive that could be visible in the output of the graphics processing operation (and if it is determined that the vertex (or set of vertices) does not belong to (is not used for) any primitives that could be visible in the output of the graphics processing operation, then the vertex (or set of vertices) is not required for generating the output of the graphics processing operation (and so should not be (and in an embodiment is not) subjected to the second vertex shading operation).

In an embodiment, a vertex (or set of vertices) is determined as being required for generating the output of the graphics processing operation if the vertex (or set of vertices): belongs to a primitive that lies at least partially within the view frustum for the output (for one of the images) being generated and/or belongs to a forward facing primitive. In an embodiment, if a vertex (or set of vertices) is determined to belong to a forward facing primitive that lies at least partially within the view frustum, it is determined as being required for generating the output of the graphics processing operation (and a second vertex shading operation will be performed for the vertex (or set of vertices)). Correspondingly, any vertex that solely belongs to primitives that lie entirely outside the view frustum or that are backward facing is in an embodiment determined as not being required (and so, in an embodiment, is not processed further).

The determination of whether a vertex (or set of vertices) should be processed further for at least one of the plural views uses, as discussed above, at least in part, vertex shaded attribute values generated from the first vertex shading operation. As discussed above, this vertex shaded data will depend upon the nature of the determination, but in an embodiment comprises vertex shaded position values for the vertices in question (as it is the position data for the vertices (and for the primitives that they form) that is needed, for example, to determine whether vertices and primitives lie within the view frustum or not).

The testing stage that determines whether a vertex (or set of vertices) should be processed further for at least one of the plural views following the first vertex shading operation can be any desired and suitable stage and element of the graphics processing pipeline. For example, a specific testing stage for performing this determination could be included in the graphics processing pipeline.

However, in an embodiment, the determination is performed by an existing (processing) stage of the graphics processing pipeline, in an embodiment by a stage that would otherwise normally perform as part of its "normal" processing operations a test or tests that can be used for the determination.

Thus, in an embodiment, the testing stage of the graphics processing pipeline that determines whether a vertex or set of vertices should be processed further for at least one of the plural views comprises a stage of the graphics processing pipeline that performs another processing operation or operations for the graphics processing pipeline, in addition to the test or tests that are used for the determination (and/or for which processing stage the test or tests that can be used for the determination are part of its overall processing operations, but the stage performs other processing operations as well).

In an embodiment, the graphics processing pipeline is a tile based graphics processing pipeline, and the tiler (the tiling stage) of the graphics processing pipeline (i.e. the stage of the graphics processing pipeline that sorts the primitives into respective regions (areas) of the render output and prepares appropriate lists of primitives for processing for each such region of the render output(s) (e.g. frame(s))) performs the determination of whether the vertices should be processed further for at least one of the plural views. Thus, in an embodiment, the testing stage is a tiler of the graphics processing pipeline.

In so called "tile based" graphics processing, the two-dimensional render output (i.e. the output of the rendering process, such as each image of the plural images representing different views of the scene to be displayed) is rendered as a plurality of smaller area sub-regions, usually referred to as "tiles". The tiles are each rendered separately (typically one after another). The rendered tiles are then combined to provide the complete rendering output (e.g. frame for display).

(Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques.)

Typically, the tiler will determine (from the vertex shaded position attribute values for the vertex or vertices) which primitives are potentially visible in each render target being generated, and thus should e.g. be subjected to the second vertex shading operation. For example, the tiling computation will normally test whether primitives are (at least partially) within the view frustum of each image of a set of plural images to be rendered and are therefore required for generating the output of the graphics processing operation. The tiler will also typically include a backward facing culling test.

Thus, in an embodiment, the tiler is a stage of the graphics processing pipeline for performing the determination, as the tiler already operates to perform "visibility" tests (such as view frustum and/or back facing tests and so on) on primitives of the scene to be displayed.

Thus, if a primitive is included in a primitive list by the tiler (the tiling process), that can be taken as an indication that (and a determination that) the primitive (and thus its vertices) could be required for generating the output of the graphics processing operation.

Thus, in an embodiment, a vertex (or set of vertices) is subjected to the second vertex shading operation if it is determined to belong to a potentially visible primitive at the tiling stage, i.e. if a primitive that it belongs to (that it is to be used for) is included in a primitive list at the tiling stage.

Correspondingly, in an embodiment, the determining of whether a vertex should be processed further for at least one of the plural views comprises determining whether the vertex belongs to (is to be used for) a primitive that has been included in a primitive list for the graphics processing operation being performed.

The tiler (and the testing stage, if not the tiler) can use any suitable and desired methods to determine which vertices should be processed further for at least one of the plural views, such as tests on the vertices (or on the primitives to which the vertices belong) based on bounding boxes, back facing determinations, or any other suitable tests that can, e.g. be performed in a tiler (at the tiling stage).

The tiler can use any suitable and desired method to sort the primitives into respective regions of the render outputs and prepare appropriate lists of primitives for processing for each such region of the render outputs.

The tiler will, e.g., iterate over each primitive (or vertex) and determine, for each render output (image), which regions of the render output in question that the primitive (or vertex) in question falls within (at least in part). Typically, the tiler will store in memory a separate primitive list for each region of each render output (each image of the plural images).

The regions of the render output for which primitive lists are prepared in this regard may comprise any suitable and desired regions that the render output may be divided into. Thus each such region may, e.g., (and in an embodiment does) correspond to a tile (a rendering tile) of the render output. Alternatively or additionally, the regions may each correspond to (and primitive lists may be prepared for) a set of plural rendering tiles of the render output and/or a part (a fraction) of a rendering tile of the render output.

Although such a configuration of primitive lists is suitable for the technology described herein, the Applicants have recognised that further optimisation of the tiler, and in particular the primitive lists maintained by the tiler, is possible.

The Applicants have recognised in that regard that, in multiview arrangements, a large number of the primitives of the scene that is to be represented will appear at the same (or similar) positions in a first image and each other image of the plural images, e.g. once the content has been transformed from the world or user space that it is initially defined for to the screen space that the images are to be displayed in. This is particularly the case for, e.g., primitives of the scene that will be in the background of the images, as these parts are not likely to move position significantly between the images.

The Applicants have further recognised that the primitives that will appear at the same (or similar) positions in the plural images, will also fall within the same regions (and tiles) of the images (at least in arrangements in which the plural images are correspondingly divided into a plurality of regions for the primitive listing process and tiles). The effect of this is that a number of primitive lists for one image will specify the same primitives as other primitive lists in another image, and those lists will essentially duplicate each other. For example, a primitive list for a given region of a first image will duplicate a primitive list for a corresponding region of a second image.

The technology described herein, according to an embodiment, exploits this coherence by, instead of storing a separate set of primitive lists for each image (view), storing and using, for each region that the set of plural images (plural different views) have been correspondingly divided into for the primitive listing process, a single primitive list for at least some of the plural images (views) (where it is possible to do that). In an embodiment, the technology described herein stores and uses a single set of primitive lists for all images (views). For example, each image of the plural images will share a single primitive list for each tile that the images have been divided into.

This can significantly reduce the memory capacity required to store the primitive lists for the set of plural images.

Thus, according to an embodiment of the technology described herein, the images for the plural different views are correspondingly divided into a plurality of smaller area regions, and the tiler (e.g. as the testing stage) is configured to prepare (provide), for each region that the images for the plural different views are divided into, a single primitive list for two or more images (views) of the set of plural images (views), in which data indicating that a primitive should be processed further for at least one of the two or more images (views) for the region is stored.

According to an embodiment, the tiler will iterate over each primitive (of, e.g., a draw call) and determine, for each render output (image), which regions (e.g. tiles) of the render output (image) the primitive in question falls within (at least in part). When it is determined that the primitive falls within a given region (e.g. tile) of a render output (image), the tiler will, e.g., store data indicating that primitive in a common primitive list for that region (e.g. tile), i.e. a primitive list (for the region (e.g. tile)) that is common to (to be shared by) two or more images (views) of the plural images (views).

In this way, the operation of the tiler can remain unchanged, except that when it determines that a primitive falls within a given region (e.g. tile) of the image (view) currently in question (that image being one that is associated with a common primitive list), the tiler will store data indicating that primitive in the common primitive list for that region (e.g. tile), rather than in a primitive list for that specific image (view).

The two or more images (views) to which the single, common primitive list relates can be any suitable and desired number of two or more images (views) of the plural different views of the scene. In one embodiment, a single primitive list is stored and maintained for the entire set of plural images (views) (for each corresponding region of the images (views)). However, in other embodiments, a single primitive list is stored for only a subset of two or more views of the plural images (views). Furthermore, the single, common primitive list for two or more images (views) may be used in addition to a primitive list that corresponds to a single image (view) of the plural images (views). Therefore, a given region of the plural images could have a primitive list associated with two or more of the images (views) and a primitive list for one or more other images (views) of the plural different images representing plural different views of the scene.

The primitive lists in an embodiment are associated with appropriate information (data) such as metadata that identifies a given primitive list as being associated with a particular image (view) or images (views) of the plural images (views), which information is in an embodiment then used by a rendering stage to identify which image(s) that the primitive list in question relates to. This information may comprise appropriate "view identifier" information.

After the primitive lists have been generated, and as will be discussed further below, the primitive lists will eventually be passed to an appropriate stage of the graphics processing pipeline (e.g. a rendering stage) for rendering the tiles (that is, after the second vertex shading stage etc.). In an embodiment, the rendering stage will read the single primitive list for a region covering (at least in part) the tile being rendered for in the plural views and render all of the primitives (or vertices) specified by the list for each render output (image, e.g. identified by the metadata), to generate plural rendering outputs (plural images) for the tile.

Although this could be acceptable in some cases (e.g. where a primitive falls within the same region in each one of the plural images to which the primitive list for the region relates), this would not always be the case. In some cases the primitive will fall within the region (e.g. tile) in one image but not another image, and the primitive will be rendered for each image to which the primitive list relates (even the ones that do not have the primitive in the region (e.g. tile)). This may introduce unwanted artefacts in the image.

It will be appreciated that the potential savings on memory (by keeping a single primitive list) may outweigh the disadvantage of (potentially) producing unwanted artefacts in the final set of plural images (views) (e.g. where only a small amount of artefacts are likely to be introduced). However, it would in some cases be desirable to provide the rendering stage with an indication of which image(s) (view(s)), of the two or more images (views) to which a given primitive list relates, that each primitive included in the list relates to.

Thus, in an embodiment, information indicating which view or views the primitive should be processed (rendered) for is generated and stored for (associated with) each primitive in a primitive list that is to be used in common for plural views being rendered.

This is achieved, in an embodiment, by (e.g. and in an embodiment, the testing stage, in an embodiment the tiler) generating and storing in memory "primitive-view" information indicating, for each primitive of a single, shared primitive list for a region (e.g. tile), which image(s) (view(s)), of the two or more images (views) to which the primitive list relates, that the primitive should be processed for (i.e. is (potentially) visible in), which information is in an embodiment then used by the rendering stage to determine which image(s) (view(s)) that the primitive in question should be processed for (for the region (e.g. tile)).

The primitive-view information indicating which image(s) (view(s)) of the two or more images (views) that the primitive should be processed for can be stored in any desired and suitable way. In an embodiment this information is associated with (e.g. stored in) the primitive lists.

Thus, a "shared" primitive list that stores data indicating a plurality of primitives to be processed for a region (e.g.

tile) for at least two of the two or more images, in an embodiment also includes, for each primitive in the primitive list, data indicating which one or more images of the two or more images that the primitive list relates to, the primitive should be processed for.

The primitive-view information can take any suitable and desired form.

In an embodiment, the primitive-view information comprises, e.g. bits in the form of, a coverage mask (a view mask). In the case of stereoscopic rendering, for example, a given primitive that has been sorted into a shared primitive list for a region (e.g. tile) may be, and is in an embodiment, associated with, e.g., and in an embodiment, a 2-bit coverage (view) mask, that can accordingly indicate whether the primitive should be processed for the region (e.g. tile) in the first image, for the region (e.g. tile) in the second image, or in the region (e.g. tile) for both images of the pair of images.

Of course, where there are more than two images representing plural different views of the scene, the coverage (view) mask will in an embodiment comprise additional bits as appropriate.

In an alternative embodiment, the primitive-view information comprises data in the form of a separate bitmap stored in memory (in addition to the primitive lists), with each entry (corresponding to one or more bits) in the bitmap indicating which view(s) that a primitive (or a group of one or more vertices) should be processed for to generate the render output.

Although storing data indicating which images (views) that each primitive included in the list should be processed for would require additional memory, it is anticipated that the total amount of memory required for such arrangements would still be smaller than the amount of memory required to maintain separate primitive lists for each image (view).

Thus, it can be seen that by storing and maintaining a single primitive list for a plurality of render outputs, an overall reduction in the amount of memory used (and therefore memory access operations performed, for example) when rendering a set of plural images representing plural different views of the same scene can be achieved.

Although the use of common primitive lists for plural render outputs has been described above primarily with reference to the situation where the render outputs are divided into a single set of regions (only) for the primitive listing process, these arrangements can equally be applied to and used where primitive lists may be prepared for at least two different sets of regions of a render output (with the regions in each respective different set of regions being of a different size (covering different areas of the render output) to the regions in the other sets of regions of the render output). For example, there could be an arrangement of plural sets of regions for which primitive lists could be prepared, with one set having regions corresponding, e.g., to individual rendering tiles (such that primitive lists will be prepared for individual rendering tiles), but with other sets of regions comprising regions that comprise plural rendering tiles, such as 2×2, 4×4, etc. rendering tiles, with corresponding primitive lists being able to be prepared for those larger regions of the render output.

In an embodiment, plural different sets of render output regions for which primitive lists can be prepared are arranged such that the render output is, in effect, covered by plural different resolution layers of regions for which primitive lists can be prepared, with each such "layer" being made up of plural regions, and, in an embodiment, in which each region of a given "layer" contains the same number of rendering tiles, and the regions in different "layers" contain different numbers of rendering tiles.

This will, in effect, provide a "hierarchical" primitive listing arrangement, in which primitive lists can be prepared for progressively increasing levels of resolution (i.e. division into sub-areas) of the render output.

Where primitive lists may be prepared for plural different sets of regions of a render output, then it would correspondingly be possible to prepare common primitive lists for a plurality of render outputs, such as for a set of plural images representing plural different views of the same scene.

In this case there could, for example, be a common (shared) set of primitive lists prepared for each different set of regions of the render output for which primitive lists can be prepared (and in an embodiment, this is what is done).

However, the Applicants have also recognised that where such a "hierarchical" primitive list arrangement is being used, it may be appropriate to have a single, common set of primitive lists for a plurality of render outputs for certain levels in the "hierarchy", but for other levels in the hierarchy to use a separate primitive list for each different render output (e.g. per view). For example, it may be appropriate to use a shared, common set of primitive lists for higher levels of the hierarchy (i.e. for primitive lists for regions corresponding to larger areas of the render output) (together with information, e.g. a bitmap, indicating which render output each primitive should be rendered for), but for lower levels of the hierarchy (relating to smaller regions of the render output) it may be preferable to use separate primitive lists for each render output (e.g. view) (in this case preferably without any additional information indicating which render output a primitive should be rendered for).

Thus, in an embodiment, the graphics processing system is a tile-based graphics processing system for which primitive lists can be prepared for at least two different sets of regions of a render output, and a set of lists of graphics primitives to be rendered to be used in common for a set of plural images representing plural different views of the same scene is prepared for at least one of the sets of regions of a render output, but separate lists of graphics primitives to be rendered are prepared for each image of the set of plural images representing plural different views of the same scene for at least one other set of the sets of regions of the render output.

The Applicants believe that the idea of storing and maintaining a single primitive list for two or more views may be new and advantageous in its own right, and not just in conjunction with the other features of the technology described herein described herein above. For example, this could still allow significant memory savings in arrangements where a vertex shader is not divided into separate vertex shading operations (stages).

An embodiment of the technology described herein comprises a method of operating a tile-based graphics processor, in which images to be rendered are divided into a plurality of tiles for rendering purposes and each tile is rendered separately and then combined to provide the complete image;

the method comprising:
  when rendering a set of plural images representing plural different views of the same scene:
  preparing, for each region of a set of regions that the images representing the plural different views are divided into, a list of graphics primitives to be rendered for the region to be used in common for the set of plural images representing the plural different views of the scene to be rendered; and rendering respective images representing the plural different views of the scene, by rendering tiles of each image using the common lists of primitives to be processed for the image regions that have been prepared for the set of plural images representing the plural different views of the scene to be rendered.

An embodiment of the technology described herein comprises a tile-based graphics processor in which images to be rendered are divided into a plurality of tiles for rendering purposes, and each tile is rendered separately and then combined to provide the complete image;

the graphics processor comprising:

tiling circuitry operable to prepare, for each region of a set of regions that an image to be rendered has been divided into, a list of graphics primitives to be rendered for the region; and rendering circuitry operable to render respective tiles of an image to be rendered using the lists of primitives to be processed for the image regions that have been prepared by the tiling circuitry;

wherein, when the graphics processor is to render a set of plural images representing plural different views of the same scene:

the tiling circuitry is configured to, prepare, for each region of the set of regions that the images representing the plural different views are divided into, a list of graphics primitives to be rendered for the region to be used in common for the set of plural images representing the plural different views of the scene to be rendered; and the rendering circuitry is configured to render respective images representing the plural different views of the scene, by rendering tiles of each image using the common lists of primitives to be processed for the image regions that have been prepared for the set of plural images representing the plural different views of the scene to be rendered.

As will be appreciated by those skilled in the art, embodiments of the technology described herein can, and in an embodiment do, include any one or more or all of the optional features of the technology described herein described herein, as appropriate.

Thus, for example, the graphics processor, particularly the tiling stage of the graphics processor, is in an embodiment configured to store in memory primitive-view information (e.g. data representing a coverage (view) mask) indicating for each primitive of a common primitive list for a region, which image(s) (view(s)), of the two or more images (views) to which the primitive list relates, that the primitive should be processed for, which information is in an embodiment then used by the rendering stage of the graphics processor to determine which image (view) or images (views) the primitive should be processed for.

Similarly, the regions that the images representing the plural different views are divided into for which lists of graphics primitives to be rendered are prepared may each correspond to a respective single rendering tile, may correspond to plural rendering tiles, and/or may correspond to only part (a fraction) of a rendering tile, etc.

It would also be possible, as discussed above, for primitive lists to be prepared for plural different sets of regions of the images, with in that case, a single common set of lists of graphics primitives being prepared for each different set of regions that the images representing the plural different views have been divided into for the primitive listing process, or for there to be a set of lists of graphics primitives to be used in common for the set of plural images being prepared for some but not all of the sets of regions that the images have been divided into for the primitive listing processes, with separate lists of graphics primitives being prepared for each different image in the set of plural images for other sets of regions that the images have been divided into for the primitive listing process, e.g., and in an embodiment, based on the size of the regions in the different sets of regions.

Returning now to the first and second embodiments of the technology described herein, after it is determined whether the vertex (or group of vertices) should be processed further for at least one of the plural views (e.g. by sorting a primitive in a primitive list as described above), that vertex is then subjected to a second vertex shading operation that vertex shades further attribute values of the vertex. Thus the result of the determination of whether the vertex (or vertices) should be processed further for at least one of the plural views is used to conditionally execute the second vertex shading operation.

Where the first vertex shading operation is performed for a set of vertices to be processed, in an embodiment only those vertices that it is determined should be processed further for at least one of the plural views are then subjected to a second vertex shading operation (or at least to the full second vertex shading operation) (i.e. any vertices that it is determined do not need to be processed further are then not subjected to the second vertex shading operation (are not subjected to the "full" vertex shading operation).

The second vertex shading operation is in an embodiment performed for all the vertices (for each of the vertices) in the set of vertices being processed for which it is determined that the vertex should be processed further, but if desired (and appropriate) the second vertex shading operation need not be performed for all (e.g. is performed for some but not all) of the vertices in question.

The second vertex shading operation could also, if desired, be performed for other vertices that were not subjected to the determination of whether they should be processed further (if any), if desired.

The second vertex shading operation can be triggered and performed for the vertices that are required to be processed further in any suitable and desirable manner.

In an embodiment, the graphics processing pipeline is configured to perform the second vertex shading operation for the vertex (or vertices) that are determined should to be processed further "on demand", e.g., and in an embodiment, as and when it is determined that a vertex (or set of vertices) should be processed further for at least one of the plural views when it is being determined whether the vertices should be processed further for at least one of the plural views.

The effect of this is that the second vertex shading operation can be (and typically will be) executed shortly after the first vertex shading operation, and such that any vertex data which has already been read in and stored in local memory (e.g. cached) for use during the first vertex shading operation is (more) likely still to be present in the local memory (e.g. cache) such that it can be used for the second vertex shading operation without having to read that data in from, e.g., main memory. This can then, e.g., make the second vertex shading operation more efficient, as there is no need to wait for vertex data to be read from, e.g., main memory. It can also, correspondingly, avoid or reduce the need to have to re-read the vertex data in from main memory again, thereby, e.g., reducing memory bandwidth, power consumption, etc.

In this case, when it is determined that a vertex should be processed further for at least one of the plural views, an execution thread for the vertex (or execution threads for the vertices) is in an embodiment created (issued) at that point to trigger the execution of the second vertex shading operation for the vertex (or vertices) in question. Thus, in an embodiment, the testing stage, e.g. the tiler, requests (and triggers) the second vertex shading for a vertex, e.g., and in an embodiment by issuing an execution thread for the vertex, as and when (and in an embodiment immediately) it includes a primitive that the vertex belongs to in a primitive list.

In this case, the system could, e.g., be, and is in an embodiment, configured to keep track of those vertices that have been subjected to the second vertex shading operation, to avoid processing the same vertex twice (e.g. where the vertex is used for multiple primitives).

In an embodiment, the second vertex shading operation is performed after it has been determined for some or all (and in an embodiment for all) of the vertices (in question) whether they should be processed further (rather than "on demand").

It will be appreciated that such an arrangement would in many cases still be able to read in data stored in local memory (e.g. cached) for use during the first vertex shading operation, thereby, e.g., reducing memory bandwidth, power consumption, etc. . . .

The second vertex shading operation itself operates to perform a vertex shading computation on a different vertex attribute value of the plural vertex attribute values associated with the vertices that it has been determined should be processed further for at least one of the plural views. This different vertex attribute value in an embodiment comprises at least one vertex attribute value whose vertex shaded attribute value will not vary for different views. For example, the vertex attribute value whose vertex shaded attribute value will not vary for different views comprises one or more of, and in an embodiment all of: colour, texture coordinates, normals, etc.

The partitioning of the vertex attributes between the first and second vertex shading operations can be selected as desired, e.g. based on the relative processing requirements of the attributes.

In this regard, the Applicants have recognised that in most cases, particularly those in which the first vertex shading operation is configured to vertex shade all of the position attributes of a vertex, most (if not all) of the vertex attribute values that were not subjected to the second vertex shading operation will be vertex attributes whose vertex shaded attribute values will not vary for different views.

Therefore the second vertex shading operation in an embodiment operates to perform vertex shading computations on the varyings (i.e. non-position attribute values) for the vertices.

In an embodiment, the second vertex shading operation vertex shades all the remaining attribute values of the vertices in question (i.e. those vertex attribute values that were not subjected to the first vertex shading operation for the vertex). It may also vertex shade the attribute values that were processed by the first vertex shading operation, but in an embodiment this Is not done (as vertex shaded versions of those attribute values will have already been derived by the first vertex shading operation).

The second vertex shading operation is in an embodiment implemented using execution threads representing the vertices that execute the appropriate vertex shading program (vertex shader). In an embodiment there is one execution thread for each vertex to be processed.

As described above, the vertex shader (vertex shading program) for the second vertex shading operation may comprise a modified version of the "full" vertex shader, for example, and in an embodiment, which takes account of the fact that some of the vertex shading (for some of the attribute values) has already been performed in the first vertex shading operation.

Further to this, the vertex shader (the vertex shading program) for the second vertex shading operation can be configured to cause the second vertex shading stage (when it executes the second vertex shading program) to perform a vertex shading computation on a vertex attribute value to generate a single vertex shaded attribute value that is common to each view of the plural different views in any appropriate and desired manner.

According to an embodiment of the technology described herein, the technology described herein comprises determining whether the second vertex shading operation includes a vertex shading computation on a vertex attribute value that can be performed only once for the set of plural views of the scene that are being rendered to generate a single vertex shaded attribute value for the set of plural views of the scene; and when it is determined that the first vertex shading operation includes a vertex shading computation that can be performed only once for the set of plural views of the scene that are being rendered, including in the vertex shading program for the second vertex shading operation (to be executed by the second vertex shading stage of the graphics processing pipeline), a sequence of at least one graphics program instruction that when executed will cause the second vertex shading stage to perform that vertex shading computation for the vertex attribute value only once for the plural different views of the scene that are being rendered and to provide only a single vertex shaded attribute value for the vertex attribute value for the set of views.

In this way, the vertex shader for the second vertex shading operation is in an embodiment executed only once for the set of plural different views (for at least one vertex attribute value), rather than for each view of the plural different views.

The determination may be performed as desired, e.g., based on state information and/or metadata that is associated with the instruction in question. For example, a vertex shading computation and/or vertex attribute value can be determined as only needing to be processed once for the set of plural views (i.e. determined as being view-independent) if it does not have any view identifier associated with it in the second vertex shading operation program code. In the case of the use of the OVR_multi-view extension for OpenGL/OpenGL ES, a shader program instruction can be identified as being view-independent if it does not have a view ID associated with it. Corresponding arrangements can be used for other graphics APIs.

The sequence of at least one graphics program instruction that will cause the vertex shading stage (when it executes the second vertex shading program) to perform the vertex shading computation for a vertex attribute value once (and only once) for the set of plural views of the scene that are being rendered can be provided in any appropriate and desired manner. In an embodiment a single set of instructions for performing that vertex shading computation is included in the second vertex shading program that is provided to and executed by the second vertex shading stage.

This can be achieved, for example, by modifying the second vertex shading operation to remove (delete) any instructions that would have caused the second vertex shading stage of the graphics processing pipeline to unnecessarily repeat a computation that can be performed only once for the set of plural views, and then recompiling the program.

Of course, if the second vertex shading operation also includes an operation that should be performed once for each view, then the second vertex shading program can be configured accordingly to include a sequence of at least one graphics program instruction that when executed will cause the second vertex shading stage to perform that vertex shading computation for the vertex attribute value once for each view. This is similar to the arrangement described above with respect to the first vertex shading operation.

The configuration of the first vertex shading operation and/or the second vertex shading operation as described above is in an embodiment done by appropriate programmable processing circuitry of the graphics processing system. In an embodiment, this is performed by a compiler of the graphics processing system (which may, e.g., be executed as part of a driver for the graphics processor on a host processor).

Thus, according to an embodiment of the technology described herein, a vertex shader compiler considers each instruction in the vertex shading program for the first vertex shading operation and/or the vertex shading program for the second vertex shading operation and determines whether the instruction is view-dependent or not (i.e. determines whether the instruction relates to a view-dependent vertex shading computation and/or vertex attribute or not).

If it is determined that the instruction is view-dependent, then the compiler operates to include the instruction multiple times, once for each view, in the compiled shader program to which the instruction relates (or alternatively modify the existing shader program instructions to provide a separate output for each view).

On the other hand, if it is determined that the shader program instruction is not view-dependent, then the compiler includes the instruction once in the compiled shader program, so that that instruction (vertex shading computation) will be executed only once in the shader program by the appropriate vertex shader of the graphics processing pipeline when it executes the vertex shader program and will provide only a single output value for that instruction.

In this way, the vertex shader programs for the first and second vertex shading operation is optimised for multi-view processing, by having instructions and computations that are view-independent only included once in the compiled vertex shader program, but those instructions and computations that are view-dependent are repeated in the compiled shader program once for each view that is required.

It should also be noted here that in an embodiment a single vertex shader program is executed for the first and for the second vertex shading operation, irrespective of whether the programs contain instructions and computations that are view-independent or that are view-dependent. Processing "multi-view" vertices in a single shader program is advantageous even when some attributes are view-dependent, as it should tend to have the effect of increasing the chances for cache hits, thereby (potentially) reducing bandwidth. For example, even when some attributes are view-dependent, it is likely that some of the input vertex attribute data that is used for the operations will be the same for all views, such that using a single shader program to process the multiple views will be likely to increase the chances for cache hits.

The technology described herein also extends to the compiler and to the compiler operation itself.

An embodiment of the technology described herein comprises a method of compiling a first vertex shading program and a second vertex shading program to generate instructions for a programmable vertex shading stage of a graphics processing pipeline that executes instructions to perform vertex shading operations on a set of vertices to be processed;

the method comprising:

for a vertex shading program to be executed by a vertex shading stage of a graphics processing pipeline when a set of plural images representing plural different views of the same scene is to be rendered:

processing the vertex shading program to create modified versions of the vertex shading program;

wherein a first modified version of the vertex shading program comprises only the instructions that when executed will cause the vertex shading stage of the graphics processing pipeline to perform vertex shading computations on the position attributes of the vertices, so as to generate vertex shaded attribute data for the position attributes of the vertices of the set; and wherein a second modified version of the vertex shading program comprises only the instructions that when executed will cause the vertex shading stage of the graphics processing pipeline to perform vertex shading computations on at least one other attribute of the vertices, so as to generate vertex shaded attribute data for the at least one other attribute of the vertices of the set;

determining, for each modified version of the vertex shading program, whether the vertex shading program includes a vertex shading computation that can be performed only once for the set of plural views of the scene that are being rendered; and when it is determined that a modified version of the vertex shading program includes a vertex shading computation that can be performed only once for the set of plural views of the scene that are being rendered, including in that modified version of the vertex shading program, a sequence of at least one graphics program instruction that when executed will cause the vertex shading stage of the graphics processing pipeline to perform that vertex shading computation for a vertex once for the set of plural views of the scene that are being rendered and to provide only a single output value for a vertex for that vertex shading computation for the set of views; and determining, for each modified version of the vertex shading program, whether the vertex shading program includes a vertex shading computation that should be performed separately for each view of the set of plural views of the scene that are being rendered; and when it is determined that a modified version of the vertex shading program includes a vertex shading computation that should be performed separately for each view of the set of plural views of the scene that are being rendered, including in that modified version of the vertex shading program, a sequence of at least one graphics program instruction that when executed will cause the vertex shading stage of the graphics processing pipeline to perform that vertex shading computation for a vertex separately for each view of the set of plural views of the scene that are being rendered, so as to provide a separate output value for a vertex for that vertex shading computation for each view of the set of views.

An embodiment of the technology described herein comprises a compiler that compiles a first vertex shading program and a second vertex shading program to generate instructions for a programmable vertex shading stage of a graphics processing pipeline that executes instructions to perform vertex shading operations on a set of vertices to be processed;

the compiler being configured to:
for a vertex shading program to be executed by a vertex shading stage of a graphics processing pipeline when a set of plural images representing plural different views of the same scene is to be rendered:
process the vertex shading program to create modified versions of the vertex shading program;
wherein a first modified version of the vertex shading program comprises only the instructions that when executed will cause the vertex shading stage of the graphics processing pipeline to perform vertex shading computations on the position attributes of the vertices, so as to generate vertex shaded attribute data for the position attributes of the vertices of the set; and
wherein a second modified version of the vertex shading program comprises only the instructions that when executed will cause the vertex shading stage of the graphics processing pipeline to perform vertex shading computations on at least one other attribute of the vertices, so as to generate vertex shaded attribute data for the at least one other attribute of the vertices of the set;
determine, for each modified version of the vertex shading program, whether the vertex shading program includes a vertex shading computation that can be performed only once for the set of plural views of the scene that are being rendered; and
when it is determined that a modified version of the vertex shading program includes a vertex shading computation that can be performed only once for the set of plural views of the scene that are being rendered, include in that modified version of the vertex shading program, a sequence of at least one graphics program instruction that when executed will cause the vertex shading stage of the graphics processing pipeline to perform that vertex shading computation for a vertex once for the set of plural views of the scene that are being rendered and to provide only a single output value for a vertex for that vertex shading computation for the set of views; and
determine, for each modified version of the vertex shading program, whether the vertex shading program includes a vertex shading computation that should be performed separately for each view of the set of plural views of the scene that are being rendered; and
when it is determined that a modified version of the vertex shading program includes a vertex shading computation that should be performed separately for each view of the set of plural views of the scene that are being rendered, include in that modified version of the vertex shading program, a sequence of at least one graphics program instruction that when executed will cause the vertex shading stage of the graphics processing pipeline to perform that vertex shading computation for a vertex separately for each view of the set of plural views of the scene that are being rendered, so as to provide a separate output value for a vertex for that vertex shading computation for each view of the set of views.

As will be appreciated by those skilled in the art, embodiments of the technology described herein can, and in an embodiment do, include any one or more or all of the optional features of the technology described herein described herein, as appropriate.

Thus, for example, the determination as to whether the modified version of the vertex shading program includes a vertex shading computation that can be performed only once for the set of plural views of the scene or should be performed separately for each view of the scene can be based on information such as state information, a variable or variables, and/or metadata, associated with the vertex shader program code, that identifies a given vertex shading computation as needing to be performed separately for each view. In other words, the determination can be based on information that in an embodiment indicates whether the vertex shader computation (e.g. that the vertex attribute value that the computation relates to) is view-dependent or not, such as a "view identifier" (a view ID) associated with it.

The first and second vertex shading operations (vertex shading stages) could be implemented in separate vertex shading execution cores of the graphics processing pipeline. However, in an embodiment they are performed as respective, different, passes in the same vertex shading execution core.

After the second vertex shading operation has been performed for the vertices that it has been determined should be processed further for at least one of the plural different views, then the complete vertex shaded attributes data for the vertices (i.e. the vertex shaded data from the first and second vertex shading operations), together with, e.g., the primitive lists generated by the tiler, can be passed to (and used by) the remaining stages of the graphics processing pipeline to generate the desired output (render target) of the graphics processing pipeline.

As is known in the art, this processing can include, inter alia, rendering operations, such as appropriate fragment processing operations performed by, e.g., a fragment shading stage so as to generate the appropriate rendered fragment data for the tiles. These processes can be performed in any desired and suitable manner, e.g. depending upon the nature of the graphics processing pipeline in question. The final render output for each view of the graphics processing operation can then, e.g., be written, e.g. to a frame buffer, in main memory, from where it can then, e.g., be displayed appropriately to achieve the desired, e.g. 3D, effect.

According to an embodiment, the image corresponding to each respective view is generated separately. For example, a rendering stage will render each render output (tile) of an image (e.g. by reading the appropriate tile lists and any bitmaps (if used) and rendering the primitives to be processed for each tile of that image) before rendering each tile of the next image.

Thus, according to an embodiment, the graphics processing pipeline comprises a rendering stage that is configured to, for plural, and in an embodiment for each, tiles of a first image of the plural images:
determine which primitives (vertices) should be processed (rendered) for the tile in question; and render the primitives that it is determined should be processed for the tile, using the vertex shaded attribute data determined at the first and/or second vertex shading stage of the graphics processing pipeline.

This method will then, e.g., be repeated for the next image of the plural images to be processed.

It will be appreciated that the determination as to which primitives (vertices) should be processed (rendered) for the tile in question can be done in any suitable or desired way.

Where each tile of each image is associated with a separate primitive list, the determination can include, for example, the step of reading the primitive list associated with the tile to determine the primitives specified for the list in question (and should therefore be rendered for that tile in the image in question).

Where a tile is associated with a single primitive list for two or more images (views), if it is determined that a primitive is specified by (included in) that list, then this can be taken (by the rendering stage) as an indication that the primitive should be rendered in the image in question and the rendering stage will accordingly render each primitive specified by the single primitive list in the image.

However, in an embodiment in which a tile is associated with a single primitive list for two or more images (views) and corresponding primitive-view information (as described above), if it is determined that a primitive is specified by that list, then the determination stage will proceed to read the primitive-view information to determine if the primitive should be processed (rendered) for the image (view) in question. The rendering stage will accordingly then render those primitives that the primitive-view information indicates as needing to be processed (rendered) for that image (view).

The process may then be repeated for the next image of the plural images (i.e. the next render output to be processed) and so on until the set of plural images representing plural different views of the scene is rendered.

It will be appreciated that the rendering process described above also applies to the more general embodiments of the technology described herein in which a common (shared) primitive list is used for two or more images representing a view from plural different viewpoints, but, e.g., the vertex shader is not divided into first and second vertex shading operations.

Furthermore, although the rendering process described above has been described with respect to rendering each image separately, this is not required.

As mentioned above, the Applicants have recognised that when rendering plural images representing different views of the same scene, corresponding tiles in each image (view) are likely to look very similar (as many primitives of the scene will fall within the same tile in a number of (if not each one of) the plural images being processed).

The Applicants have also recognised that there is a possibility to exploit this coherence between corresponding tiles in each image, e.g., and in an embodiment by rendering corresponding regions of the plural images successively (where it is possible to do that). This can then allow re-use of at least some of the data generated for a region of a first image when rendering the corresponding region of another image of the set of plural images, thereby reducing the processing burden.

This can be achieved in the technology described herein in any suitable and desired manner.

According to an embodiment of the technology described herein, the rendering stage of the graphics processing pipeline is configured to interleave rendering between the different images (views) for each tile.

For example, although the rendering process is in an embodiment configured to render each region of the plurality of regions for a first image (view) in turn (with respect to the rendering of that image (view)), the rendering computation can, and in an embodiment will, after completing rendering of a given region in the first image (view), proceed to render the corresponding region in the second, (and if present, the third and fourth) image (view) (and so on) before rendering the next region of the first image (view).

Thus, according to an embodiment of the technology described herein, the rendering stage of the graphics processing pipeline is configured to: render a tile of a first image of the plural images (e.g. render a first tile of the first image); after rendering the tile of the first image, render the same tile of a second image of the plural images (e.g. render the first tile of the second image); after rendering the same tile of the second image, render a different tile of the first image that has not been rendered (e.g. render the next tile of the first image), and so on and so forth.

Where the set of plural images comprises more than two images, it will be possible to render a, e.g. first, tile of each image of the set of plural images before rendering a, e.g. second, tile of the first image.

Although the above embodiment has been described with respect to interleaving rendering between each image of the set of plural images, this is not required. It is possible, and in an embodiments is it done, to interleave rendering between a subset of the plural images, e.g. only between the images for which a single primitive list is stored and maintained. For example, the rendering process could interleave rendering for a tile between the render outputs (images) to which a primitive list for the tile relates.

Furthermore, instead of interleaving rendering on a per-tile basis, it is possible, and in some cases desirable, to interleave rendering between plural images on a per-primitive (or per-vertex) basis.

This may be the case, for example, where the graphics processing system does not employ a tile-based graphics processing pipeline (graphics processor). For example the rendering stage of the graphics processing pipeline may be configured to receive a sequence of primitives (vertices) to be processed and corresponding vertex shaded attributes data (specifying at least the positions of the primitives (vertices) in each of the images), and render each primitive in each image that the primitive falls within in turn.

However, in an embodiment, interleaved rendering on a per-primitive basis is carried out for arrangements in which the graphics processing system does employ a tile-based graphics processing pipeline.

For example, instead of completing the rendering of a first tile in the first image before rendering a first tile of a second image of the plural images, the rendering computation could render a first primitive of a tile in the first image and then render the same primitive in the (e.g. same tile in the) second image, before returning to the first image to render a second primitive of the tile in the first image.

This is particularly the case where a primitive to be processed is sorted into respective primitive lists that are common to two or more images of the set of plural images. For example, a primitive list reader could read the primitive list (and any associated metadata or primitive-view information, for example) and determine therefrom which images that the primitive should be rendered for. The rendering process will accordingly then render that primitive in each of those images before rendering the next primitive in the primitive list.

Thus, the rendering process in an embodiment starts at the first tile in the rendering order for the first image of the plural images, and renders a first primitive of the first tile. After rendering the first primitive of the first tile, the same primitive is rendered in the second image and any other image to which the primitive list for the tile relates. After rendering the primitive in all of the images to which the primitive list for the tile relates, a second primitive of the first tile of the first image is rendered, and so on and so forth. (It will be appreciated that all the relevant vertex shaded attribute values required for rendering a primitive in each view will be available to the rendering stage.)

Other arrangements would, of course, be possible.

The rendering operation in an embodiment proceeds in this manner until all the primitives of the first image and the second image have been rendered.

The Applicants believe that the idea of performing interleaved rendering on a per-primitive basis may be new and advantageous in its own right, and not just in conjunction with the other features of the technology described herein described herein above. For example, this could reduce the processing burden when rendering multi-view images regardless of whether or not the vertex shader at the beginning of the pipeline is divided into separate stages.

Thus, an embodiment of the technology described herein comprises a method of operating a graphics processing pipeline when rendering a set of plural images representing plural different views of the same scene; the method comprising:

rendering a first primitive (or vertex) of a scene for a first image of the plural images; after rendering the first primitive (or vertex) for the first image, rendering the same primitive (or vertex) for a second image of the plural images; after rendering the first primitive (or vertex) for the second image, rendering a second primitive (or vertex) of the scene for the first image.

An embodiment of the technology described herein comprises a graphics processing pipeline configured to, when rendering a set of plural images representing plural different views of the same scene:

render a first primitive (or vertex) of a scene for a first image of the plural images; after rendering the first primitive (or vertex) for the first image, render the same primitive (or vertex) for a second image of the plural images; after rendering the first primitive (or vertex) for the second image, render a second primitive (or vertex) of the scene for the first image.

As will be appreciated by those skilled in the art, embodiments of the technology described herein can, and in an embodiment do, include any one or more or all of the optional features of the technology described herein described herein, as appropriate.

Thus, for example, the graphics processing pipeline can be a tile-based graphics processing pipeline, and could comprise:

a primitive list reader configured to read a primitive list associated with a tile to be rendered and determine from the primitive list (and any associated bitmap, for example) which views (images) that a given, e.g. the first, primitive contained in the primitive list should be rendered for. As mentioned above, the primitive lists could include appropriate information, e.g. metadata, for indicating which views that the primitive list relates to (and, e.g., for indicating whether or not individual vertices are associated with a bitmap).

The graphics processing pipeline will also, in an embodiment, comprise a rendering stage configured to render that (e.g. first) primitive in each of the views (images) that the primitive has been determined should be processed for, before rendering the next primitive in the primitive list.

The above describes the elements of the graphics processing pipeline that are involved in the operation in the manner of the technology described herein. As will be appreciated by those skilled in the art, the graphics processing pipeline can otherwise include, and in an embodiment does include, any one or one or more, and in an embodiment all, of the other processing stages that graphics processing pipelines normally include. Thus, for example, the graphics processing pipeline in an embodiment also includes a primitive setup stage, a rasteriser, etc. In an embodiment the rendering stage of the graphics processing pipeline is in the form of or includes a programmable fragment shader.

The graphics processing pipeline may also contain any other suitable and desired processing stages that a graphics processing pipeline may contain such as a depth (or depth and stencil) tester, a blender, etc.

In an embodiment, the graphics processing pipeline comprises, and/or is in communication with, one or more memories and/or memory devices that store the data described herein, and/or that store software for performing the processes described herein. The graphics processing pipeline may also be in communication with the host microprocessor, and/or with a display for displaying images based on the output of the graphics processing pipeline.

The render output to be generated may comprise any render output that is to be generated by the graphics processing pipeline. The technology described herein can be used for all forms of output that a graphics processing pipeline may be used to generate, such as frames for display, render-to-texture outputs, etc. In an embodiment, the render output is an output frame (which may then be displayed appropriately along with other render outputs generated by the multi-view rendering process).

Hence the technology described herein should (and in an embodiment does produce some useful output data, e.g. output data for use in subsequent graphics processing operations and/or for display by a display. The output data is can be used to produce images of plural views which are the same or differ from one another, wherein said images are for displaying on a display.

The technology described herein may be carried out by any kind of graphics processing system. However, in an embodiment, the graphics processing pipeline and system is a tile-based (tiling) graphics processing pipeline and system. In this case, the pipeline in an embodiment also comprises a tile buffer for storing tile sample values and/or a write out unit that operates to write the data in the tile buffer (e.g. once the data in the tile buffer is complete) out to external (main) memory (e.g. to a frame buffer).

The overall graphics processing system that the graphics processing pipeline is part of in an embodiment comprises a host processor that executes applications that can require graphics processing by the graphics processing pipeline.

The host processor will send appropriate commands and data to the graphics processing pipeline to control it to perform graphics processing operations and to produce graphics processing (render) output required by applications executing on the host processor.

To facilitate this, the host processor should, and in an embodiment does, also execute a driver for the graphics processing pipeline and a compiler or compilers for compiling shader programs to be executed by the vertex shading stages (along with any other shading stages) of the graphics processing pipeline (which compiler may be, and in an embodiment is, a part of the driver).

Thus in an embodiment, the graphics processing pipeline is in communication with a host microprocessor (that is part of the overall graphics processing system) that executes a driver for the graphics processing pipeline and a compiler or compilers for the graphics processing pipeline. The graphics processing pipeline and/or host microprocessor are in an embodiment also in communication with a display for displaying the images generated by the graphics processing pipeline (thus in an embodiment the graphics processing system further comprises a display for displaying the images generated by the graphics processing pipeline).

Although the compiler in an embodiment runs on a host processor of the overall data processing system that includes the graphics processing pipeline (with the graphics processing pipeline then being on another processor, such as a graphics processor, that is associated with the host processor (such that the compiler and compiled code run on separate processors within the overall data graphics processing system)), other arrangements would be possible. For example the compiler could run on the same processor as the compiled code, or the compiler could be run on a (completely) separate processor, such as the program being precompiled on a separate system and being distributed in a compiled form.

In an embodiment, the various functions of the technology described herein are carried out on a single graphics processing platform that generates and outputs the rendered fragment data that is, e.g., written to a frame buffer for a display device.

The technology described herein can be implemented in any suitable system, such as a suitably configured microprocessor based system. In some embodiments, the technology described herein is implemented in computer and/or micro-processor based system.

The technology described herein is in an embodiment implemented in a portable device, such as, and in an embodiment, a mobile phone or tablet.

The various functions of the technology described herein can be carried out in any desired and suitable manner. For example, the functions of the technology described herein can be implemented in hardware or software, as desired. Thus, for example, the various functional elements and stages of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/ or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on data processor, a computer program element comprising computer software code portions for performing the methods herein described when the program element is run on data processor, and a computer program comprising code adapted to perform all the steps of a method or of the methods herein described when the program is run on a data processing system. The data processing system may be a microprocessor, a programmable FPGA (Field Programmable Gate Array), etc. . . .

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

DETAILED DESCRIPTION

A number of embodiments of the technology described herein will now be described in the context of the processing of computer graphics for display.

FIG. 1 shows a typical computer graphics processing system.

An application 2, such as a game, executing on a host processor 1 will require graphics processing operations to be performed by an associated graphics processing unit (graphics processing pipeline) 3. To do this, the application will generate API (Application Programming Interface) calls that are interpreted by a driver 4 for the graphics process pipeline 3 that is running on the host processor 1 to generate appropriate instructions to the graphics processor 3 to generate graphics output required by the application 2. To facilitate this, a set of "instructions" will be provided to the graphics processor 3 in response to instructions from the application 2 running on the host system 1 for graphics output (e.g. to generate a frame to be displayed).

FIG. 2 shows the graphics processing pipeline 3 of the present embodiment in more detail.

The graphics processing pipeline 3 shown in FIG. 2 is a tile-based renderer and will thus produce tiles of a render output data array, such as an output frame to be generated.

The render output data array may, as is known in the art, typically be an output frame (an image of the set of plural images) intended for display on a display device, such as a screen or printer, but may also, for example, comprise intermediate data intended for use in later rendering passes (also known as a "render to texture" output), etc.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.

FIG. 2 shows the main elements and pipeline stages of the graphics processing pipeline 3 that are relevant to the operation of the present embodiment. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuitry and/or processing logic, etc., for performing the necessary operation and functions.

As shown in FIG. 2, the graphics processing pipeline 3 includes a number of stages, including vertex shader 20, a hull shader 21, a tesselator 22, a domain shader 23, a geometry shader 24, a tiler 25, a rasterisation stage 26, an early Z (depth) and stencil test stage 27, a renderer in the form of a fragment shading stage 28, a late Z (depth) and stencil test stage 29, a blending stage 210, a tile buffer 211 and a downsampling and writeout (multisample resolve) stage 212.

The vertex shader 20 takes the input data values (vertex attribute values) associated with the vertices, etc., defined for the output to be generated, and processes those data values to generate a set of corresponding "vertex shaded" output data values for use by subsequent stages of the graphics processing pipeline 3.

For a given output to be generated by the graphics processing pipeline, there will typically be a set of vertices defined for the output in question. The primitives to be processed for the output will then be indicated as comprising given vertices in the set of vertices for the graphics processing output being generated.

The vertex shading operation operates to transform the attributes for each vertex into a desired form for the subsequent graphics processing operations. This may comprise, for example, transforming vertex position attribute values from the world or user space that they are initially defined for to the screen space that the output of the graphics processing system is to be displayed in, modifying the input data to take account of the effect of lighting in the image to be rendered, etc.

The hull shader 21 performs operations on sets of patch control points and generates additional data known as patch constants. The tessellation stage 22 subdivides geometry to create higher-order representations of the hull, and the domain shader 23 performs operations on vertices output by the tessellation stage (similar to a vertex shader). The geometry shader 24 processes entire primitives such as a triangles, points or lines.

These stages together with the vertex shader 20 effectively perform all the necessary fragment frontend operations, such as transformation and lighting operations, and primitive setup, to setup the primitives to be rendered, in response to commands and vertex data provided to the graphics processing pipeline 3.

Once all the primitives to be rendered have been appropriately set up, the tiler 25 then determines which primitives need to be processed for each tile that the render output has been divided into for processing purposes. To do this, the tiler 25 compares the location of each primitive to be processed with the tile positions, and adds the primitive to a respective primitive list for each tile that it determines the primitive could (potentially) fall within. Any suitable and desired technique for sorting and binning primitives into tile lists, such as exact binning, or bounding box binning or anything in between, can be used for the tiling process.

Once the tiler has completed the preparation of the primitive tile lists (lists of primitives to be processed for each tile), then each tile can be rendered.

To do this, each tile is processed by the graphics processing pipeline stages shown in FIG. 2 that follow the tiler 25.

Thus, when a given tile is being processed, each primitive that is to be processed for that tile (that is listed in a tile list for that tile) is passed to the rasteriser 26.

The rasterisation stage 26 of the graphics processing pipeline 3 operates to rasterise the primitives into individual graphics fragments for processing. To do this, the rasteriser 26 rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 27 performs a Z (depth) test on fragments it receives from the rasteriser 26, to see if any fragments can be discarded (culled) at this stage. To do this, it compares the depth values of (associated with) fragments issuing from the rasteriser 26 with the depth values of fragments that have already been rendered (these depth values are stored in a depth (Z) buffer that is part of the tile buffer 211) to determine whether the new fragments will be occluded by fragments that have already been rendered (or not). At the same time, an early stencil test is carried out.

Fragments that pass the fragment early Z and stencil test stage 27 are then sent to the fragment shading stage 28. The fragment shading stage 28 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 28 is in the form of a shader pipeline (a programmable fragment shader).

There is then a "late" fragment Z and stencil test stage 29, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 211 to determine whether the fragment data for the new fragments should replace the fragment data of the fragments that have already been rendered, by comparing the depth values of (associated with) fragments issuing from the fragment shading stage 28 with the depth values of fragments that have already been rendered (as stored in the depth buffer). This late fragment depth and stencil test stage 29 also carries out any necessary "late" alpha and/or stencil tests on the fragments.

The fragments that pass the late fragment test stage 29 are then subjected to, if required, any necessary blending operations with fragments already stored in the tile buffer 211 in the blender 210. Any other remaining operations necessary on the fragments, such as dither, etc. (not shown) are also carried out at this stage.

Finally, the (blended) output fragment data (values) are written to the tile buffer 211 from where they can, for example, be output to a frame buffer 213 for display. The depth value for an output fragment is also written appropriately to a Z-buffer within the tile buffer 211. (The tile buffer stores colour and depth buffers that store an appropriate colour, etc., or Z-value, respectively, for each sampling point that the buffers represent (in essence for each sampling point of a tile that is being processed).) These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4x multisampling is being used).

The tile buffer is provided as part of RAM that is located on (local to) the graphics processing pipeline (chip).

The data from the tile buffer 211 is input to a downsampling (multisample resolve) write out unit 212, and thence output (written back) to an external memory output buffer, such as a frame buffer 213 of a display device (not shown). (The display device could comprise, e.g., a display comprising an array of pixels, such as a computer monitor or a printer.)

The downsampling and writeout unit 212 downsamples the fragment data stored in the tile buffer 211 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer 213 in a main memory) for storage, the next tile is then processed, and so on, until sufficient tiles have been processed to generate the entire render output (e.g. frame (image) to be displayed). The process is then repeated for the next render output (e.g. frame) and so on.

As can be seen from FIG. 2, the graphics processing pipeline 3 includes a number of programmable processing or "shader" stages, namely the vertex shader 20, hull shader 21, domain shader 23, geometry shader 24, and the fragment shader 28. These programmable shader stages execute respective shader programs that have one or more input variables and generate sets of output variables. Typically the shader program in question will be executed for each work item (e.g. vertex in the case of a vertex shader) to be processed. Typically an execution thread will be issued for each work item to be processed, and the thread will then execute the instructions in the shader program to produce the desired "shaded" output data.

The application 2 provides the shader programs to be executed using a high-level shader programming language, such as GLSL, HLSL, OpenCL, etc. These shader programs are then translated by a shader language compiler to binary code for the target graphics processing pipeline 3. This may include the creation of one or more internal (intermediate) representations of the program within the compiler. (The compiler may, e.g., be part of the driver 4, with there being a special API call to cause the compiler to run. The compiler execution can thus be seen as being part of the, e.g. draw call preparation done by the driver in response to API calls generated by an application).

Other arrangements for the graphics processing pipeline 3 would, of course, be possible.

The technology described herein relates to the situation in which the vertex shading operation is divided into two parts, a first vertex shading operation that generates vertex shaded attribute data for at least one of the set of plural attribute values associated with a vertex, and a conditionally executed second vertex shading operation that generates vertex shaded attribute data for attribute values of the vertex that were not subjected to the first vertex shading operation. The condition for executing the second vertex shading operation is based on whether the vertex should be processed further for at least one view of the set of plural views to be rendered.

The first vertex shading operation on a vertex to be processed is also configured to perform vertex shading computations on a vertex attribute value associated with the vertex to generate a separate vertex shaded attribute value for each view. The second vertex shading operation is configured to perform vertex shading processing on a different vertex attribute value associated with the vertex to generate a single vertex shaded attribute value that is common to the set of plural different views.

Figure 3:
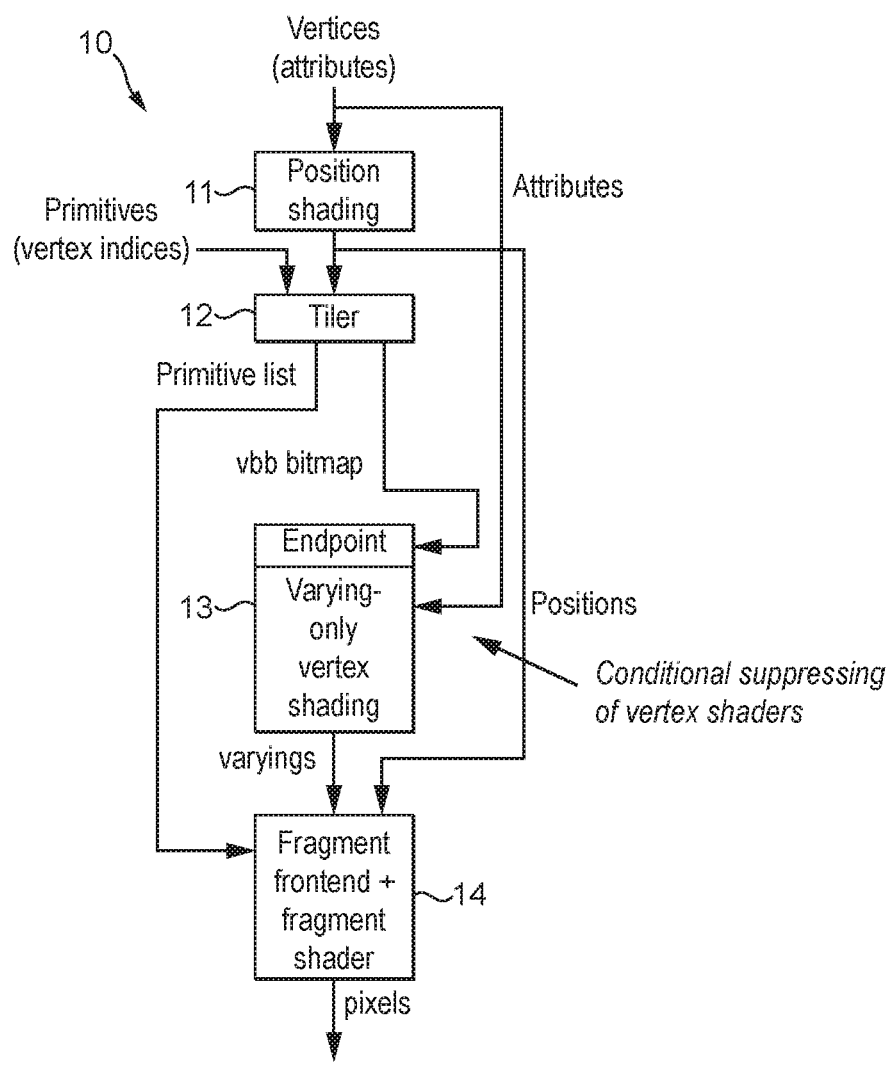
FIG. 3 shows schematically a graphics processing pipeline of an embodiment of the technology described herein.

FIG. 3 schematically illustrates a tile-based graphics processing pipeline 10 according to an embodiment of the technology described herein.

As shown in FIG. 3, the graphics processing pipeline 10 comprises a position shading stage 11, a tiler 12, a varying-only vertex shading stage 13 and a fragment frontend and fragment shader stage 14.

The position shading stage 11 is a vertex shading stage of the graphics processing pipeline 10 that is configured to perform a first, partial, vertex shading operation to vertex shade the positional attributes only of the vertices being processed.

As can be seen in FIG. 3, the position shading stage 11 is operable to receive vertices (that is, the data values associated with the original attributes for the vertices) from the application that requires the graphics processing. The position shading stage 11 will then perform vertex shading computations on the positional attributes of those vertices (e.g. by means of some transformation function) to generate partial vertex shaded data (that is, partially transformed vertices where only the positions have been transformed).

The first vertex shading program will be configured to cause the position shading stage 11 (when it executed the first vertex shading program) to perform vertex shading computations on the X component value of the vertex position attribute values, to generate a separate vertex shaded X value for each view of the set of plural views of the scene.

The first vertex shading program will also be configured to cause the position shading stage 11 (when it executes the first vertex shading program) to perform a vertex shading computation for each of the Y, Z, W position attribute values once (and only once) for the set of plural views of the scene that are being rendered to provide only a single vertex shaded Y, Z and W value for the set of views.

The vertex shaded data (comprising the vertex shaded position attribute data generated by the first vertex shading stage 11), together with a list of the primitives to be processed (which is indicated in terms of the respective indices of the vertices making up each primitive), is then fed to the tiler 12 of the graphics processing pipeline 10.

The tiler 12 uses these two inputs to identify which primitives should be processed for each tile that the render outputs of the plural images have been divided into, and prepares a respective primitive list (tile list) for each tile, indicating the primitives that should be processed for that tile. The tiler 12 can sort the primitives into tiles using any desired and suitable technique for that process. (It will be appreciated here that the only vertex shaded data required for the tiler to generate the primitive list(s) is the vertex shaded position data.) However, in an embodiment, as described above, the tiler 12 will keep a single tile list for each tile, corresponding to the set of plural images.

As part of its operation, the tiler 12 will, as is known in the art, identify primitives that should be processed further for at least one of the views to generate the render outputs. This may include, for example, performing view frustum and back-face culling tests on the primitives.

In the present embodiment, the tiler also operates to determine vertices that should be processed further for at least one of the plural views (in each render output). The tiler 12 does this by assuming that each vertex that belongs to a primitive that has been included in a primitive list (i.e. that is accordingly to be processed further) should be processed further.

Where the tiler 12 stores a single tile list corresponding to the set of plural images (or views) for each tile, the tiler 12 will, as part of this operation, generate a bitmap, indicating which views (or images) that the primitives that it has identified as needing to be processed further should be processed for. In the present embodiment, each entry (bit) in the vertex bitmap corresponds to a single view. Thus, when the tiler includes a primitive in a primitive list for a tile, it sets the corresponding bits in the bitmap for the primitive (e.g. to "1") to indicate that that primitive should be processed further in that view.

Once the tiler 12 has completed the primitive lists, the primitive lists and the initial list of vertices (attributes) are provided to the varying only vertex shading stage 13 of the graphics processing pipeline.

The varying only vertex shading stage 13 performs vertex shading computations on the remaining varying data (attributes) of the vertices that the primitive lists indicates should be processed further (and stores the vertex-shaded varying data in memory, from where it can be accessed by later stages of the graphics processing pipeline 10). Thus, the varying only vertex shading stage 13 of the graphics processing pipeline 10 performs a second partial vertex shading operation, but only on those vertices that the tile lists indicate as needing to be processed further.

The second vertex shading program will be configured to cause the varying shading stage 13 (when it executes the second vertex shading program) to perform a vertex shading computation for a varying attribute value once (and only once) for the set of plural views of the scene that are being rendered to provide only a single vertex shaded varying value for the set of views.

It will be appreciated that any vertices that have been subjected to the second vertex shading operation at the varying only vertex shading stage 13 will now have a complete set of vertex shaded attributes (e.g. the vertex shaded position data generated at the position shading stage 11, and the vertex shaded varying data generated at the varying only vertex shading stage 13).

This vertex shaded data can then be used, together with the tile primitive lists (generated by the tiler 12), to generate the desired rendering outputs (plural images) of the graphics processing pipeline.

Thus, the vertex shaded positions and varyings data and the primitive lists are then passed to the fragment frontend and fragment shader stage 14 of the graphics processing pipeline 10 for subsequent processing.

The fragment frontend and fragment shader stage 14 performs appropriate front-end, rendering (fragment shading), and fragment back-end, processing operations for each image, as is known in the art.

The front end operations include primitive (triangle) setup and rasterisation of the primitives.

The rasteriser will, as is known in the art, receive primitives to be rasterised, test those primitives against sampling point positions, and generate graphics fragments to be rendered representing the primitives accordingly. Each fragment generated by the rasteriser may represent (have associated with it) a single sampling point, or plural sampling points, as desired. In an embodiment, each fragment represents a set of plural, in an embodiment four (2×2), sampling points.

The renderer then processes the fragments generated by the rasteriser to generate rendered fragment data (such as red, green and blue (RGB) colour values and an "Alpha" (transparency) value) for (covered) sampling points that the fragments represent, as is known in the art. These rendering processes may include, for example, fragment shading, blending, texture-mapping, etc. In the present embodiment, the renderer is in the form of a programmable fragment shader.

The rendered fragment data (sampling position data) for each image of the plural images is then written to a tile buffer and, subsequently, written out as pixel data to a frame buffer, e.g. for display (not shown) (this may include backend fragment operations, such as downsampling, to determine the final pixel colours to be stored in the frame buffer).

Figure 4:
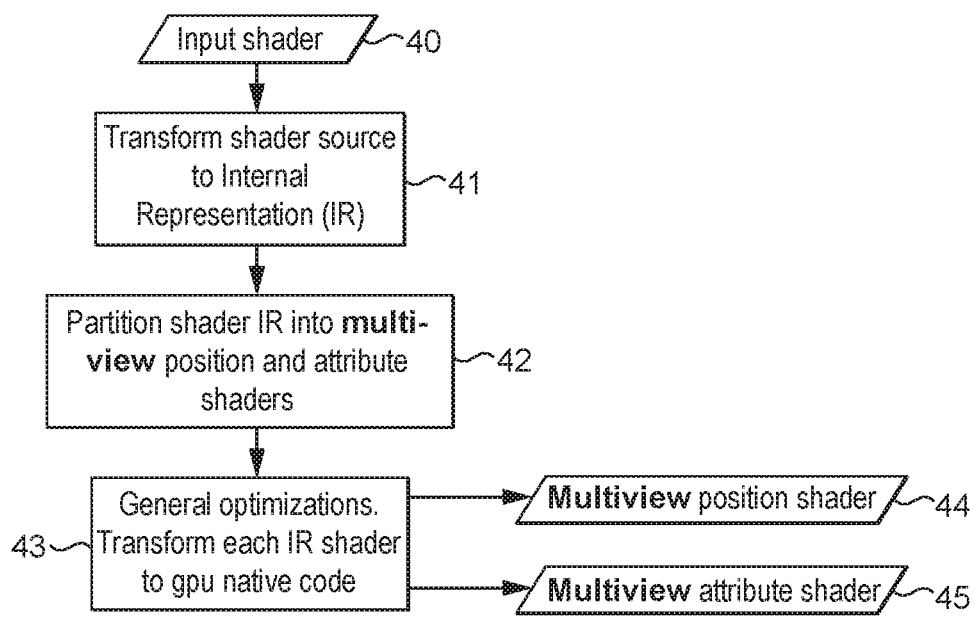
FIG. 4 is a flowchart illustrating the operation of the compiler of the graphics processing pipeline in an embodiment of the technology described herein.

FIG. 4 is a flowchart illustrating the operation of the compiler of the graphics processing pipeline in an embodiment of the technology described herein.

As shown in FIG. 4, the vertex shader compiler (which may, e.g., be executed as part of a driver for the graphics processing pipeline on a host processor) will receive an input vertex shader program from the application that requires the graphics processing to be compiled (step 40).

As discussed above, a shader program to be executed by a given "shader" stage of a graphics processing pipeline will be provided by the application that requires the graphics processing using a high-level shader programming language, such as GLSL, HLSL, OpenCL, etc. The high-level shader program is then translated by the shader language compiler to binary code for the target graphics processing pipeline. This binary code will consist of "instructions" which are specified in the instruction set specification for the given target graphics processing pipeline.

The compilation process for converting the high-level shader language to binary code instructions may take place via one or more internal (intermediate) representations of the program within the compiler (and there may be several successive intermediate (internal) representations within the compiler), if desired.

As shown in FIG. 4, it is assumed that the compilation process in the present embodiment uses an internal representation of the shader program. Other arrangements would, of course, be possible.

Thus, as shown in FIG. 4, the compiler first transforms the shader source code it receives to an appropriate internal representation of the shader program for the compilation process (step 41).

As shown in FIG. 4 the vertex shader compiler then performs at step 42 further compilation operations on the internal representation of the vertex shader program to partition the vertex shader program to create two modified versions of the parsed shader program, one modified version being provided for the first vertex shading operation and the other modified version being provided for the second vertex shading operation.

The first modified version (for the first vertex shading operation) can be compiled by removing (deleting) the non-position attributes (or rather the instructions that will cause the vertex shading stage to perform vertex shading computations on the non-position attribute values), that are not to be processed by the first vertex shading operation.

The second modified version (for the first vertex shading operation) can be compiled by removing (deleting) the position attributes (or rather the instructions that will cause the vertex shading stage to perform vertex shading computations on the position attribute values), that are not to be processed by the second vertex shading operation.

Other arrangements for partitioning (parsing) the vertex shader (the vertex shading programs) into respective shaders (programs) for the first and second vertex shading operations would, of course, be possible.

After the vertex shader has been partitioned into a first vertex shader for the first vertex shading operation and a second vertex shader for the second vertex shading operation, the shaders are further optimised for multiview rendering.

To do this, the vertex shader compiler considers each instruction in the (internal representation of) the position shader program and attribute shader program and determines whether the instruction is view-dependent or not (i.e. determines whether the instruction relates to a view-dependent vertex shading computation and/or vertex attribute or not). This determination may be performed as desired, e.g., based on state information and/or metadata that is associated with the instruction in question. In the case of the use of the OVR_multi-view extension for OpenGL/OpenGL ES, a shader program instruction is identified as being view-dependent if it has a view ID associated with it. Corresponding arrangements can be used via the graphics APIs.

If it is determined that the instruction is view-dependent, then the compiler operates to include the instruction multiple times in the compiled shader program to which the instruction relates (be it the position shader program or the attribute shader program), once for each view that is being generated. In other words, the compiler operates to repeat the instruction in the appropriate compiled shader program once for each view (with the instruction being configured to load the appropriate input values for the view in question and to output its output value appropriately for the view in question).

On the other hand, if it is determined that the shader program instruction is not view-dependent, then the compiler includes the instruction once in the compiled shader program, so that that instruction (vertex shading computation) will be executed only once in the shader program by the appropriate vertex shader of the graphics processing pipeline when it executes the vertex shader program and will provide only a single output value for that instruction.

In this way, the first vertex shader program and the second vertex shader program is optimised for multi-view processing, by having instructions and computations that are view-independent only included once in the compiled vertex shader program, but those instructions and computations that are view-dependent are repeated in the compiled shader program once for each view that is required. This then provides a compiled position shader program and a compiled attribute shader program that is optimised for multi-view rendering.

The so-optimised shader programs may then be further subject to the more general shader compiler optimisations, and subsequently transformed to the native binary code for the graphics processing pipeline (step 43), with the native shader program code then being provided appropriately to the graphics processing pipeline for execution (steps 44 and 45).

In the present embodiment, exemplary view dependent computations and vertex attribute values include transformed vertex positions (the X value components at least), view vectors and reflection vectors. Exemplary view independent computations and vertex attributes include matrix skinning, vertex texturing and texture coordinates. Other arrangements would, of course, be possible.

Figure 5:
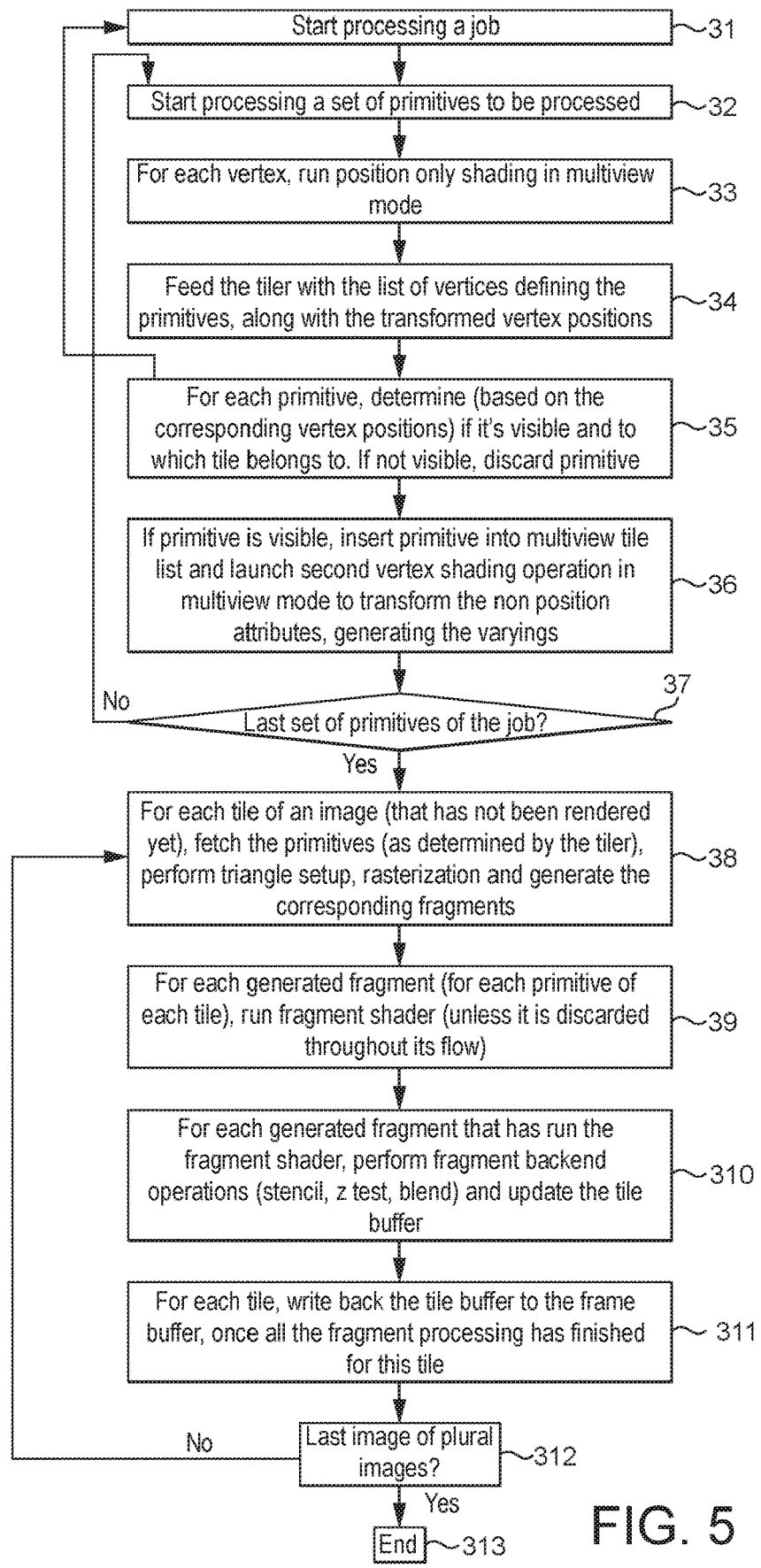
FIG. 5 is a flowchart illustrating the operation of a graphics processing pipeline in an embodiment of the technology described herein.

FIG. 5 shows in more detail the operation of a graphics processing pipeline according to an embodiment of the technology described herein. In particular, FIG. 5 is a flow chart illustrating the operational steps executed by a graphics processing pipeline when set to operate according to an embodiment of the technology described herein.

FIG. 5 shows the processing steps for processing a plurality of images (output frames) representing a different view of a scene, and so as shown in FIG. 5, the process starts when a graphics processing job for the multi-view rendering is to be processed (step 31).

The operation proceeds to step 32 in order to start processing a set of primitives to be processed for the plural views of a scene in a manner according to the embodiments of the technology described herein.

At step 33, position only vertex shading is performed for each vertex of the set of primitives to generate vertex shaded position values for the position attribute values of the vertices.

It will be appreciated here that the position shading (the first vertex shading operation) can be performed either before the tiling stage of the graphics processing pipeline or as and when required by the tiler. In the latter case, step 32 (and its subsequent steps) is in an embodiment triggered by a request being sent by the tiler to the vertex shading stage of the graphics processing pipeline. Thus, the process of step 32 will not begin until the tiler reads in a primitive to be processed and issues a corresponding request for position shading to the vertex shading stage. This operation will be described in more detail below with respect to FIG. 6.

As mentioned above with respect to FIG. 3, the first vertex shading program is configured to cause the position shading stage 11 (when it executed the first vertex shading program) to perform vertex shading computations on the X component value of the vertex position attribute values, to generate a separate vertex shaded X value for each view of the set of plural views of the scene. The first vertex shading program is also configured to cause the position shading stage 11 (when it executes the first vertex shading program) to perform a vertex shading computation for each of the Y, Z, W position attribute values once (and only once) for the set of plural views of the scene that are being rendered to provide only a single vertex shaded Y, Z and W value for the set of views.

The tiler is then fed with the vertex shaded position values and a list of vertices defining the primitives of the set of primitives (step 34).

At step 35, the tiler determines, for each primitive, if the primitive is (potentially) visible in each one of the plural images (e.g. if the primitive is within the view frustum and is forward facing), and, if so, which tile or tiles it at least partially falls within in each of those images. The tiler uses the vertex shaded position values, and the lists of indices for the primitives of the set of primitives to be processed, to do this.

If the tiler determines that a primitive is visible, it also includes the visible primitive in a suitable tile list. In this arrangement, the tiler stores a single tile list corresponding to the set of plural images (or views) for each tile. The tiler will therefore also generate a bitmap, indicating which views (or images) that the primitives that it has identified as needing to be processed further should be processed for.

After the tiler has finished its operation (or alternatively, as soon as the tile includes a primitive in a tile list), each vertex belonging to a visible primitive is subjected to the second vertex shading operation to transform the non-position attributes of the vertex (step 36). The transformed varyings data is then stored in memory.

Steps 32 to 36 are repeated for each set of primitives to be processed for the graphics processing job, until all the visible primitives and their vertices have been fully shaded and sorted into primitive lists (step 37).

Once it is determined at step 37 that the current set of primitives is the last set of the graphics processing job, the operation proceeds to step 38 (as will be described below).

After completing steps 32 to 37, the graphics processing pipeline will have performed full vertex shading computations (and derived a full set of vertex shaded attributes) for only the vertices that are determined by the tiling process to belong to (potentially) visible primitives. This can significantly reduce the number of ultimately redundant vertex shading computations compared to graphics processing pipelines that simply perform the full vertex shading operation for all the vertices (and for all the vertex attributes) in advance of the tiling process.

Steps 38 to 311 are performed for each tile of an image of the plural images to be rendered. The tiles may be processed one after another, or tiles may be processed in parallel, depending on the capabilities of the graphics processing pipeline.

At step 38, the primitives for the tile (as determined by the tiler) are fetched, and front-end operations such as triangle setup and rasterisation for each primitive for the tile are performed, to generate the corresponding fragments for rendering the primitives.

Each generated fragment (for each primitive of the tile) is then subjected to a fragment shading operation (unless a fragment is discarded during its processing) to generate rendered fragment data for the fragment (step 39).

The fragments that complete the fragment shading process are then subjected, at step 310, to backend fragment operations, such as stencil and depth tests, and blending operations. The resulting data generated for each tile sampling position (e.g. the final colour values etc. that will be used to represent the sampling positions of the tiles) is then stored in a tile buffer located in on-chip memory, for example.

At step 311, once the fragment processing has finished for a tile, the data stored in the tile buffer (which by this point includes all the necessary data to represent the entire tile) is written to the frame buffer in order to be displayed.

After steps 38 to 311 have been performed for each tile of a render output (image), the method proceeds to step 312, at which it is determined whether or not the image that was rendered in steps 38 to 311 was the last image of the plural images to be rendered for the scene.

If the current image is not the last image of the plural images to be rendered, then steps 38 to 311 are repeated for the next image of the set of plural images that has not been rendered yet. If, however, the current image was the last image, then all of images for the multi-view rendering process have been generated and the method ends at step 313. The plural images can, and in an embodiment are, then displayed appropriately.

It will be appreciated here that although the rendering process of steps 38 to 312 have been described above with respect to rendering each image representing plural different views of the scene separately, this is not required. As mentioned above, the rendering stage of the graphics processing pipeline can be configured to interleave rendering between the different views for each tile (or for each primitive). If the rendering process is interleaved between the plural images, steps 38 to 311 of FIG. 5 will be performed with respect to a single tile or primitive, rather than for each tile of an image as described above. In this way, the graphic processing system will fully render a tile or primitive in a first image (at steps 38 to 311), and then determine (at step 312) whether there are any further images that the tile or primitive should be rendered for. If there are, then the method will repeat steps 38 to 311 on the same primitive for the next image of the plural images to be rendered. This method will repeat until the current tile or primitive has been rendered for each image, and the method will proceed to render the next tile or primitive in the plural images (i.e. repeat steps 38 to 312 for the next tile or primitive) only if the current tile or primitive has been completely rendered for each image.

Figure 6:
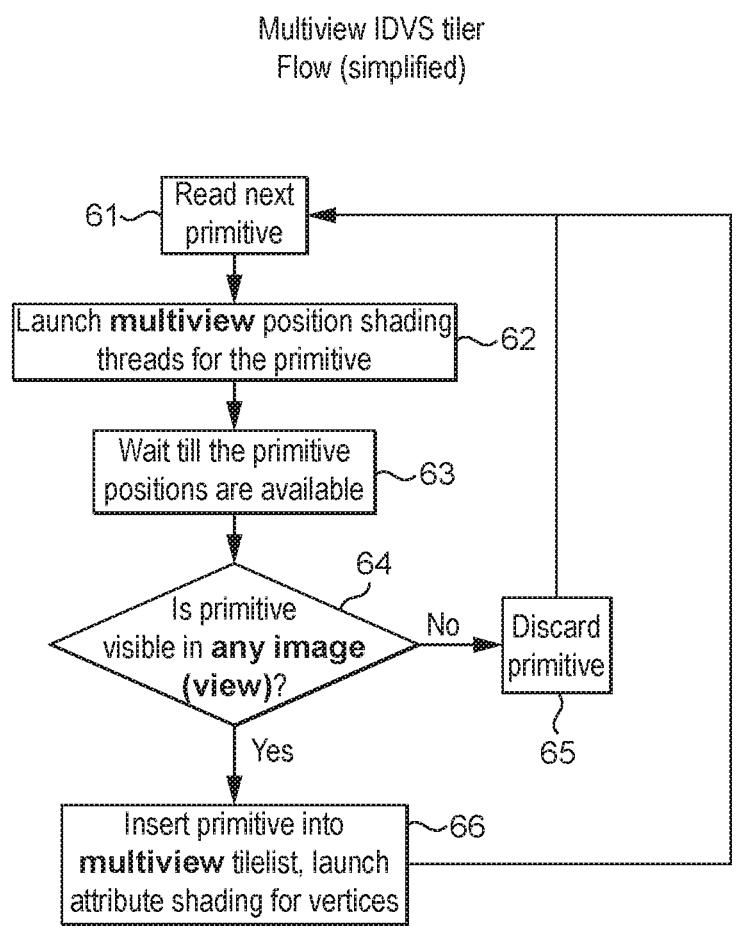
FIG. 6 is a flowchart illustrating the operation of the tiler of the graphics processing pipeline in an embodiment of the technology described herein.

FIG. 6 is a flowchart illustrating the operation of the tiler of the graphics processing pipeline in an embodiment of the technology described herein. In particular, FIG. 6 illustrates (the workflow of the tiler when configured to perform) step 35 of FIG. 5 according to an embodiment in which the tiler also operates to trigger the first and second vertex shading operations on demand.

The tiler is configured to read a list of vertices defining a set of primitives to be processed by the graphics processing pipeline, e.g., from memory (although other sources can be used). Thus, at step 61 the method begins by the tiler reading in the next primitive from the list of primitives to be processed.

The tiler will then operate to trigger the vertex shading for the positional attributes (attribute values) of the vertices associated with the primitive in question at step 62.

This is done by the tiler sending a position shading request for the vertices to a vertex shading stage 20 of the graphics processing pipeline. Thus, the tiler is operable to trigger vertex shading for the positional attributes of the vertices as needed during the tiling operation.

In response to a position shading request for the vertices, the vertex shading stage 20 will read in the raw position attribute values for the vertices from memory and perform vertex shading computations on the position attribute values of the vertices to generate vertex shaded position attribute data (values) for the set of plural different views of the scene.

As mentioned above with respect to steps 32 and 33 of FIG. 3, this will include the multiview shading optimisations in which the first vertex shading operation comprises performing vertex shading computations on the X component value of the vertex position attribute values to generate a separate vertex shaded X value for each view of the set of plural views of the scene and performing a vertex shading computation for each of the Y, Z, W position attribute values once (and only once) to provide only a single vertex shaded Y, Z and W value for the set of views.

Where appropriate, the tiler will wait (at step 63) for the vertex shading stage to finish the position shading operation (i.e. will wait for all of the vertex shaded position attribute values to become available (i.e. to be generated and stored)) for the vertices of the primitive. (The vertex shading stage may send a signal to the tiler indicating that it has finished its operation.)

Once the vertex shaded position values are available, the tiler uses the vertex shaded position values and the list of vertices to determine if the primitive is (potentially) visible in each one of the plural images (e.g. if the primitive is within the view frustum and is forward facing), and, if so, which tile or tiles it at least partially falls within in each of those images (step 64).

If the tiler determines at step 64 that the primitive is not visible in one or more of the plural images (views), the tiler will proceed to step 65 and discard the primitive as they are not required for further processing (e.g. to render the set of plural images representing the plural different views of the scene). The method will then return to step 61 and repeat steps 62 to 64 for the next primitive in the list of primitives to be processed.

However, if the tiler determines at step 64 that the primitive is visible in one or more of the plural images (views), the tiler includes the visible primitive in a suitable tile list or lists (step 66).

In this arrangement, the tiler generates and stores a single, common, "multiview" tile list corresponding to the set of plural images (or views) for each tile. The tiler will therefore also generate a coverage (view) mask, indicating which images (views) the primitive has been identified as being visible in.

When the tiler determines that the primitive is visible (and should therefore be processed further for at least one of the plural views), the tiler triggers the vertex shading stage to perform a varying only vertex shading operation on the remaining varying attribute values of the primitive (of its vertices) (step 66).

This is done (in this arrangement at least) by the tiler sending a varying shading request for the primitive to the vertex shading stage 20 of the graphics processing pipeline. In response to such a request, the vertex shading stage reads in the raw varying attributes data for the primitive (its vertices) from memory and performs vertex shading computations on the non-position attribute values of the vertices to generate vertex shaded varyings attribute data (values) for the set of plural different views of the scene.

The shaded, transformed varyings data is then stored in memory, where it can be used later on by the graphics processing pipeline.

This process of steps 61 to 66 is repeated for each primitive that falls to be considered for the set of plural images in question.

It will be appreciated that although the tiler has been described with respect to FIG. 6 as being configured to trigger the first and second vertex shading operation, e.g. on demand, this is not required.

Figure 7:
FIGS. 7 and 8 illustrate a "common" primitive (tile) list according to an embodiment of the technology described herein.

FIG. 7 illustrates a single, common, "multiview" tile list corresponding to the set of plural images (or views) for each tile primitive (tile) list according to an embodiment of the technology described herein.

In particular, FIG. 7 relates to an embodiment of the technology described herein in which the graphics processor is configured to perform stereoscopic rendering (by rendering a pair of images representing two different views of the same scene).

FIG. 7 shows a pair of images representing the same scene but from slightly different viewpoints so as to give a stereoscopic effect.

The first image represents the scene from the viewpoint of the left eye. The second image of the pair represents the scene from the viewpoint of the right eye. The images may accordingly be referred to as the left view image 71 and right view image 72 respectively.

As can be seen in the Figure, the left view image 71 and the right view image 72 have been correspondingly divided into a plurality of tiles, wherein each tile is to be rendered separately and then combined to provide the complete image for each view. Each tile of an image is associated with an index value indicating the position of the tile within the image in question. Tiles that are at the same position in the left view image 71 and the right view image 72 are thus associated with the same index value. For example, the tile in the top left corner of the left view image 71 and the tile in the top left corner of the right view image 72 has the same index value, (0, 0).

When processing such a pair of images for a stereoscopic display, typically the tiler will be configured to store a separate set of primitive lists for each view, where each tile of the left view image 71 and each tile of the right view image 72 will have a corresponding respective primitive list for the tile. In the present embodiments, however, this operation is modified so as to provide a single set of common (shared) primitive lists for both views (for both the left view image 71 and the right view image 72). For example, each image of the plural images will share a single primitive list for each tile that the images have been correspondingly divided into.

Therefore, when a given primitive 73 to be processed by the graphics processing pipeline falls within the same tile of the left view image 71 and the right view image 72, that primitive 73 will be included in the common, shared tile (primitive) list for that tile.

For example, as shown in FIG. 7, a primitive 73 falling within the tile (1, 0) in the left view image 71 and the right view image 72 will be sorted into (associated with) a single shared tile list for the tile (1, 0).

In the example of FIG. 7, the tile list entry 74 for tile (1, 0) will include the indices for the vertices defining the primitive 73 in question (vertex indices $i_0$, $i_1$, and $i_2$) and a primitive-view mask indicating which image(s) of the pair of images that the primitive 73 is (potentially) visible in. In this particular example, a 2-bit coverage (view) mask is used, and the mask is set to a value of (1, 1) for the primitive 73, indicating that the primitive 73 should be processed for the tile in both the left view image 71 and the right view image 72.

Figure 8:
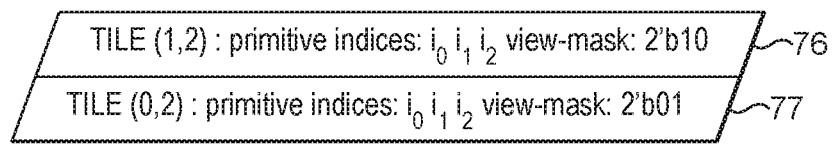

FIG. 8 illustrates a further example of the single, common, "multiview" tile list corresponding to the set of plural images (or views) for each tile primitive (tile) lists according to embodiments of the technology described herein in which stereoscopic rendering is performed.

As was the case in the arrangement of FIG. 7, the pair of images have been correspondingly divided into a plurality of tiles, where tiles at the same position in both images have the same index value, and the tiler is configured to provide a single set of primitive lists for both views (for both the left view image 71 and the right view image 72 of the pair).

In the arrangement of FIG. 8, however, a given primitive 75 to be processed by the graphics processing pipeline is located at slightly different horizontal positions in the two images. That is, there is a parallax observed for objects viewed along the two different lines of sight.

The difference between the position of the primitive 75 in the left view image 71 and the right view image 72 is illustrated in FIG. 8 by the fact that the primitive 75 in the left view image 71 falls within tile (1, 2) of the left view image 71 21, but is displaced such that it falls within tile (0, 2) of the right view image 72.

In such an arrangement, the tiler will include the indices for the vertices defining the primitive 75 (vertex indices $i_0$, $i_1$ and $i_2$) in the tile list entries 76 and 77 for both tiles (2, 1) and (0, 2). However, in addition to the vertex indices defining the primitive 75, the tiler will include a primitive-view mask in the tile list entries 76 and 77, each mask indicating which image(s), of the pair of images, the primitive 75 is (potentially) visible in for that tile.

In this particular example, the 2-bit coverage (view) mask for tile (1, 2) is set to a value of (1, 0), indicating that the primitive 75 is (potentially) visible in (to be processed for) that tile in the left view image 71, but not the right view image 72. The 2-bit coverage (view) mask for tile (0, 2) is set to a value of (0, 1), indicating that the primitive 75 is (potentially) visible in (to be processed for) that tile in the right view image 72, but not the left view image 71.

In this way, the technology described herein can significantly reduce the memory capacity required to store the primitive lists for the set of plural images, whilst still allowing the rendering stage of the graphics processing pipeline to determine which images of the set of plural images that a primitive included in a tile list should be processed for.

It can be seen from the above that the technology described herein, in an embodiment, comprises a system that, inter alia, generates a full set of vertex shaded attributes (required for generating plural images representing different views of a scene for display, for example) only for vertices that it is determined will be required to generate the outputs.

This is achieved in embodiments of the technology described herein at least, by dividing the vertex shading operation into two stages (two passes), a first stage (pass) that performs vertex shading computations on some but not all of attribute values of the vertices, and then a second stage (pass) that performs vertex shading computations on other attribute values of the vertices, but only for vertices that it has been determined should be processed further.

Such a system is advantageous in that it minimises redundant vertex shading computations, such as those that are performed on vertices that will not be visible in the scene to be rendered for display, thereby improving the overall performance of the graphics processing system.

The technology described herein provides further advantages, in embodiments, by configuring the first vertex shading operation to, inter alia, generate a separate vertex shaded attribute value for each view and configure the second vertex shading operation to, inter alia, generate a single vertex shaded attribute value for the set of plural views.

This is advantageous in that some vertex shading computations can, e.g., be performed "per view", whereas other vertex shading processing can be performed only once for the complete set of views, thereby reducing the overall amount of vertex shading computations performed for the vertex.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a graphics processing system, the graphics processing system including:
   a graphics processing pipeline comprising vertex shading circuitry that is operable to perform vertex shading operations on initial vertex attribute data associated with the vertices to generate vertex shaded attribute data;
   the method comprising, when rendering a set of plural images representing plural different views of the same scene:
   performing a first vertex shading operation on a vertex to be processed by the graphic processing pipeline, wherein the first vertex shading operation comprises performing vertex shading computations on one of plural vertex attribute values of the initial vertex attribute data associated with the vertex, so as to generate vertex shaded attribute data for the vertex attribute value comprising a separate vertex shaded attribute value for each view of the set of plural different views of the scene;

using some or all of the vertex shaded attribute values generated by the first vertex shading operation for the plural views to test whether the vertex that has been subjected to the first vertex shading operation should be processed further for at least one of the plural views; and when the testing determines that the vertex should be processed further for at least one of the plural views:

performing a second vertex shading operation on the vertex, wherein the second vertex shading operation comprises performing a vertex shading computation on a different vertex attribute value of the plural vertex attribute values associated with the vertex, so as to generate for the vertex attribute value, vertex shaded attribute data comprising a single vertex-shaded attribute value that is common to each view of the plural different views; and when the testing determines that the vertex should not be processed further for any of the plural views:

not performing the second vertex shading operation on the vertex;

wherein:

the graphics processing pipeline is a tile-based graphics processing pipeline in which the images of the set of plural images representing the plural different views are divided into a plurality of tiles for rendering purposes; and the method further comprises:

dividing each image of the set of plural images representing the plural different views into a set of plural regions, such that each image is divided into the same set of regions;

preparing, for each region of the set of regions that the images representing the plural different views are divided into, a primitive list for said region that is used in common for all the images of the set of plural images, the primitive list for a region listing the primitives that are processed further when rendering said region for at least one of the images in the set of plural images, wherein a primitive is included in the common primitive list for a region when the primitive falls within said region in at least one of the images in the set of plural images; and rendering the images of the set of plural images, by rendering regions of each image using the common primitive lists that have been prepared for each region of the images of the set of plural images representing the plural different views of the scene to be rendered;

wherein rendering the images of the set of plural images by rendering regions of each image using the common primitive lists that have been prepared for each region of the images of the set of plural images representing the plural different views of the scene to be rendered comprises:

when rendering a region of a first image of the set of plural images:

using the common primitive list for said region to determine which primitives to process for said region in the first image; and processing those determined primitives to render said region in the first image;

and when rendering the same region of a second different image of the set of plural images:

using the same common primitive list for said region to determine which primitives to process for said region in the second image; and processing those determined primitives to render said region in the second image.

2. The method of claim 1, wherein the vertex attribute value that is processed by the first vertex shading operation comprises a positional attribute value of the vertex in question.

3. The method of claim 1, wherein the vertex attribute value that is processed by the second vertex shading operation comprises a varying attribute value of the vertex in question.

4. The method of claim 1, wherein:

the graphics processing pipeline is a tile-based graphics processing pipeline in which the images representing the plural different views are divided into a plurality of tiles for rendering purposes; and the step of determining whether the vertex that has been subjected to the first vertex shading operation should be processed further for at least one of the plural views comprises determining whether the vertex in question belongs to a primitive that is included in a primitive list for at least one of the images being rendered.

5. The method of claim 1, further comprising:

storing for each primitive in a common primitive list for a region, primitive-view information indicating which image or images, of the two or more images to which the common primitive list relates, the primitive should be processed for, the primitive-view information then being used when rendering the images to determine which image or images the primitives should be rendered for.

6. The method of claim 1, further comprising:

rendering a first primitive or vertex for a first image of the plural images;

after rendering the first primitive or vertex for the first image, rendering the same primitive or vertex for a second image of the plural images; and after rendering the first primitive or vertex for the second image, rendering a second primitive or vertex for the first image.

7. A graphics processing system for rendering a set of plural images representing plural different views of the same scene, the graphics processing system including a graphics processing pipeline comprising:

vertex shading circuitry configured to perform a first vertex shading operation on a vertex to be processed by the graphic processing pipeline, wherein the first vertex shading operation comprises performing vertex shading computations on one of plural vertex attribute values of the initial vertex attribute data associated with the vertex, so as to generate vertex shaded attribute data for the vertex attribute value comprising a separate vertex shaded attribute value for each view of the set of plural different views of the scene;

testing circuitry configured to use some or all of the vertex shaded attribute values generated by the first vertex shading operation for the plural views to test whether the vertex that has been subjected to the first vertex shading operation should be processed further for at least one of the plural views; and vertex shading circuitry configured to:

when the testing circuitry determines that the vertex should be processed further for at least one of the plural views:

perform a second vertex shading operation on the vertex, wherein the second vertex shading operation comprises performing a vertex shading computation on a different vertex attribute value of the plural vertex attribute values associated with the vertex, so as to generate for the vertex attribute value, vertex shaded attribute data comprising a single vertex-shaded attribute value that is common to each view of the plural different views; and when the testing circuitry determines that the vertex should not be processed further for any of the plural views:

not perform the second vertex shading operation on the vertex;

wherein the graphics processing pipeline is a tile-based graphics processing pipeline in which the images representing the plural different views are divided into a plurality of tiles for rendering purposes and comprises tiling circuitry configured to prepare, for each region of a set of regions that an image to be rendered has been divided into, a list of graphics primitives to be processed for the region, and rendering circuitry configured to render respective tiles of an image of the set of plural images to be rendered using the lists of primitives to be processed for the regions that have been prepared by the tiling circuitry;

wherein:

the tiling circuitry is configured to:

divide each image of the set of plural images representing the plural different views into a set of plural regions, such that each image is divided into the same set of regions;

prepare, for each region of the set of regions that the images representing the plural different views are divided into, a primitive list for said region, that is used in common for all the images of the set of plural images, the primitive list for a region listing the primitives that are processed further when rendering said region for at least one of the images in the set of plural images, wherein a primitive is included in the common primitive list for a region when the primitive falls within said region in at least one of the images in the set of plural images; and the rendering circuitry is configured to render the images of the set of plural images, by rendering regions of each image using the common primitive lists that have been prepared for each region of the images of the set of plural images representing the plural different views of the scene to be rendered;

wherein rendering the images of the set of plural images by rendering regions of each image using the common primitive lists that have been prepared for each region of the images of the set of plural images representing the plural different views of the scene to be rendered comprises:

when rendering a region of a first image of the set of plural images:

using the common primitive list for said region to determine which primitives to process for said region in the first image; and processing those determined primitives to render said region in the first image;

and when rendering the same region of a second different image of the set of plural images:

using the same common primitive list for said region to determine which primitives to process for said region in the second image; and processing those determined primitives to render said region in the second image.

8. The system of claim 7, wherein the vertex attribute value that is processed by the first vertex shading operation comprises a positional attribute value of the vertex in question.

9. The system of claim 7, wherein the vertex attribute value that is processed by the second vertex shading operation comprises a varying attribute value of the vertex in question.

10. The system of claim 7, wherein:

the graphics processing pipeline is a tile-based graphics processing pipeline in which the images representing the plural different views are divided into a plurality of tiles for rendering purposes; and the testing circuitry comprises tiling circuitry of the graphics processing pipeline and is configured to:

determine whether a vertex that has been subjected to the first vertex shading operation should be processed further for at least one of the plural views by determining whether the vertex in question belongs to a primitive that is included in a primitive list for at least one of the images being rendered.

11. The system of claim 7, wherein:

the tiling circuitry is further configured to store, for each primitive in a common primitive list for a region, primitive-view information indicating which image or images, of the two or more images to which the common primitive list relates, the primitive should be processed for; and the rendering circuitry of the graphics processing pipeline is configured to use the primitive-view information to determine which image or images the primitives should be rendered for.

12. The system of claim 7, wherein the graphics processing pipeline comprises rendering circuitry configured to render respective images representing the plural different views of the scene by:

rendering a first primitive or vertex for a first image of the plural images;

after rendering the first primitive or vertex for the first image, rendering the same primitive or vertex for a second image of the plural images; and after rendering the first primitive or vertex for the second image, rendering a second primitive or vertex for the first image.

13. A method of operating a tile-based graphics processor, in which images to be rendered are divided into a plurality of tiles for rendering purposes;

the method comprising:

when rendering a set of plural images representing plural different views of the same scene:

dividing each image of the set of plural images representing the plural different views into a set of plural regions, such that each image is divided into the same set of regions;

preparing, for each region of the set of regions that the images representing the plural different views are divided into, a primitive list for said region that is used in common for all the images of the set of plural images, the primitive list for a region listing the primitives that are processed further when rendering said region for at least one of the images in the set of plural images, wherein a primitive is included in the common primitive list for a region when the primitive falls within said region in at least one of the images in the set of plural images; and rendering the images of the set of plural images, by rendering regions of each image using the common primitive lists that have been prepared for each region of the images of the set of plural images representing the plural different views of the scene to be rendered;

wherein rendering the images of the set of plural images by rendering regions of each image using the common primitive lists that have been prepared for each region of the images of the set of plural images representing the plural different views of the scene to be rendered comprises:

when rendering a region of a first image of the set of plural images:

using the common primitive list for said region to determine which primitives to process for said region in the first image; and processing those determined primitives to render said region in the first image;

and when rendering the same region of a second different image of the set of plural images:

using the same common primitive list for said region to determine which primitives to process for said region in the second image; and processing those determined primitives to render said region in the second image.

14. The method of claim 13, further comprising:

storing for each primitive in a list of graphics primitives to be rendered for a region to be used in common for the set of plural images, primitive-view information indicating which image or images, to which the primitive list relates, the primitive should be processed for, the primitive-view information then being used when rendering the images to determine which image or images the primitives should be rendered for.

* * * * *